United States Patent
Tabata et al.

[11] Patent Number: 6,081,042
[45] Date of Patent: Jun. 27, 2000

[54] HYBRID VEHICLE DRIVE SYSTEM INCLUDING CONTROLLABLE DEVICE BETWEEN ENGINE AND ELECTRIC MOTOR AND VEHICLE DRIVE WHEELS, AND APPARATUS FOR CONTROLLING THE DEVICE DEPENDING UPON SELECTED OPERATION MODE OF THE SYSTEM

[75] Inventors: Atsushi Tabata, Okazaki; Yutaka Taga, Aichi-ken; Ryuji Ibaraki, Toyota; Tsuyoshi Mikami, Toyota; Hiroshi Hata, Toyota, all of Japan

[73] Assignee: Toyota Jidosha Kabushiki Kaisha, Toyota, Japan

[21] Appl. No.: 08/821,312

[22] Filed: Mar. 20, 1997

[30] Foreign Application Priority Data

| Mar. 22, 1996 | [JP] | Japan | 8-066516 |
| Mar. 26, 1996 | [JP] | Japan | 8-070371 |
| Aug. 22, 1996 | [JP] | Japan | 8-220248 |

[51] Int. Cl.$^7$ .................................................. B60L 11/02
[52] U.S. Cl. ................................. 290/45; 290/11; 475/5; 180/65.2
[58] Field of Search ................................. 290/11, 32, 45; 310/266; 180/65.2; 475/5

[56] References Cited

U.S. PATENT DOCUMENTS

| 5,558,588 | 9/1996 | Schmidt | 475/5 |
| 5,571,058 | 11/1996 | Schmidt | 475/5 |
| 5,789,882 | 8/1998 | Ibaraki et al. | 318/148 |
| 5,856,709 | 1/1999 | Ibaraki et al. | 290/45 |
| 5,873,426 | 2/1999 | Tabata et al. | 180/65.7 |
| 5,875,691 | 3/1999 | Hata et al. | 74/661 |
| 5,875,864 | 3/1999 | Yano et al. | 180/65.4 |
| 5,887,670 | 3/1999 | Tanaka et al. | 180/65.2 |
| 5,903,061 | 5/1999 | Tsuzuki et al. | 290/40 C |

FOREIGN PATENT DOCUMENTS

| A-63-291738 | 11/1988 | Japan. |
| A-3-176240 | 7/1991 | Japan. |
| A-5-65843 | 3/1993 | Japan. |
| A-5-77660 | 3/1993 | Japan. |
| A-5-164233 | 6/1993 | Japan. |
| A-5-296323 | 11/1993 | Japan. |
| A-6-341535 | 12/1994 | Japan. |
| A-7-67208 | 3/1995 | Japan. |

*Primary Examiner*—Nicholas Ponomarenko
*Attorney, Agent, or Firm*—Oliff & Berridge, PL

[57] ABSTRACT

A hybrid drive system for a motor vehicle, wherein a controllable device such as an automatic transmission or a center differential device is disposed between drive wheels of the vehicle and a drive power source consisting of an engine operated by combustion of a fuel, and an electric motor operated with an electric energy, and the engine and/or the electric motor is/are operated for driving the motor vehicle in different running modes. The controllable device is controlled by a control device on the basis of an input torque received by the controllable device. The control device is adapted to estimate the input torque of depending upon a currently selected one of the running modes, or effect learning control of the controllable device in different manners corresponding to the different running modes.

23 Claims, 20 Drawing Sheets

FIG. 3

| SHIFT LEVER | TRANSMISSION | CLUTCHES | | | BRAKES | | | | | ONE-WAY CLUTCHES | | | SPEED RATIO |
|---|---|---|---|---|---|---|---|---|---|---|---|---|---|
| | | $C_0$ | $C_1$ | $C_2$ | $B_0$ | $B_1$ | $B_2$ | $B_3$ | $B_4$ | $F_0$ | $F_1$ | $F_2$ | |
| NEUTRAL | N | ○ | | | | | | | | | | | — |
| REVERSE | Rev | ○ | | ○ | | | | | | | | | −4.550 |
| DRIVE | 1st | ○ | ○ | | | | | | ○ | ○ | | | 3.357 |
| DRIVE | 2nd | ● | ○ | | | | | | ● | ○ | | ○ | 2.180 |
| DRIVE | 3rd | ○ | ○ | | | ● | | ○ | | ○ | ○ | | 1.424 |
| DRIVE | 4th | ○ | ○ | ○ | | | ○ | | | ○ | | | 1.000 |
| DRIVE | 5th | | ○ | ○ | ○ | | ○ | | | | | | 0.753 |

FIG. 7

| MODE | CLUTCHES | | ENGINE 12 | STORAGE DEVICE 58 | MODE NOMENCLATURE |
| --- | --- | --- | --- | --- | --- |
| | CE1 | CE2 | | | |
| 1 | OFF | ON | OFF | DISCHARGED | MOTOR DRIVE |
| 2 | ON | ON | ON | NO ENG. CSMD | ENGINE DRIVE |
| 3 | ON | ON | ON | CHARGED | ENGINE DRIVE + CHARGING |
| 4 | ON | ON | ON | DISCHARGED | ENGINE · MOTOR DRIVE |
| 5 | ON | OFF | ON | CHARGED | VEHICLE START BY ENGINE |
| 6 | OFF | ON | OFF | CHARGED | REGENERATIVE BRAKING |
| 7 | ON | OFF | ON | NO ENG. CSMD | ELECTRIC NEUTRALITY |
| 8 | ON | ON | OFF | NO ENG. CSMD | ENGINE BRAKING |
| 9 | ON | ON | START | DISCHARGED | ENGINE STARTING |

FIG. 10

| MODE | MODE NOMENCLATURE | INERTIA COMPENSATION TERM T(I) | OUTPUT TORQUE TERM T(S) | ENGINE TORQUE LOSS TERM T(E) | CHARGING TORQUE LOSS TERM T(J) | AUXILIARY DEVICE TORQUE LOSS TERM T(H) |
|---|---|---|---|---|---|---|
| 1 | MOTOR DRIVE | MOTOR INERTIA TORQUE TM(I) | MOTOR OUTPUT TM(S) | — | CHARGING TORQUE LOSS TM(J) | AUXILIARY DEVICE TORQUE LOSS T(H) |
| 2 | ENGINE DRIVE | ENGINE INERTIA TORQUE TE(I) | ENGINE OUTPUT TE(S) | ENGINE TORQUE LOSS TE(E) | — | AUXILIARY DEVICE TORQUE LOSS T(H) |
| 3 | ENGINE DRIVE + CHARGING | ENGINE INERTIA TE(I) MOTOR INERTIA TORQUE TM(I) | ENGINE OUTPUT TE(S) | ENGINE TORQUE LOSS TE(E) | CHARGING TORQUE LOSS TM(J) | AUXILIARY DEVICE TORQUE LOSS T(H) |
| 4 | ENGINE·MOTOR DRIVE | ENGINE INERTIA TE(I) MOTOR INERTIA TORQUE TM(I) | ENGINE OUTPUT TE(S) MOTOR OUTPUT TM(S) | ENGINE TORQUE LOSS TE(E) | — | AUXILIARY DEVICE TORQUE LOSS T(H) |

FIG. 12

| ESTIMATED INPUT TORQUE | $P_{SLU}*$ |
|---|---|
| SMALL | $P_{SLU}*_1$ |
| · | $P_{SLU}*_2$ |
| · | · |
| MEDIUM | · |
| · | · |
| · | · |
| LARGE | · |

FIG. 13

MODE 1

| ESTIMATED INPUT TORQUE | $\Delta P_{SLU}$ |
|---|---|
| SMALL | $\Delta P_{SLU11}$ |
| · | $\Delta P_{SLU12}$ |
| MEDIUM | · |
| · | · |
| LARGE | · |

MODE 2

| ESTIMATED INPUT TORQUE | $\Delta P_{SLU}$ |
|---|---|
| SMALL | $\Delta P_{SLU21}$ |
| · | $\Delta P_{SLU22}$ |
| MEDIUM | · |
| · | · |
| LARGE | · |

MODE 3

| ESTIMATED INPUT TORQUE | $\Delta P_{SLU}$ |
|---|---|
| SMALL | $\Delta P_{SLU31}$ |
| · | $\Delta P_{SLU32}$ |
| MEDIUM | · |
| · | · |
| LARGE | · |

MODE 4

| ESTIMATED INPUT TORQUE | $\Delta P_{SLU}$ |
|---|---|
| SMALL | $\Delta P_{SLU41}$ |
| · | $\Delta P_{SLU42}$ |
| MEDIUM | · |
| · | · |
| LARGE | · |

FIG. 17

| ESTIMATED INPUT TORQUE | $P_{SLC}*$ |
|---|---|
| SMALL | $P_{SLC}*_1$ |
| . | $P_{SLC}*_2$ |
| . | . |
| MEDIUM | . |
| . | . |
| . | . |
| LARGE | . |

FIG. 18

MODE 1

| ESTIMATED INPUT TORQUE | $\Delta P_{SLC}$ |
|---|---|
| SMALL | $\Delta P_{SLC11}$ |
| · | $\Delta P_{SLC12}$ |
| MEDIUM | · |
| · | · |
| LARGE | · |

MODE 2

| ESTIMATED INPUT TORQUE | $\Delta P_{SLC}$ |
|---|---|
| SMALL | $\Delta P_{SLC21}$ |
| · | $\Delta P_{SLC22}$ |
| MEDIUM | · |
| · | · |
| LARGE | · |

MODE 3

| ESTIMATED INPUT TORQUE | $\Delta P_{SLC}$ |
|---|---|
| SMALL | $\Delta P_{SLC31}$ |
| · | $\Delta P_{SLC32}$ |
| MEDIUM | · |
| · | · |
| LARGE | · |

MODE 4

| ESTIMATED INPUT TORQUE | $\Delta P_{SLC}$ |
|---|---|
| SMALL | $\Delta P_{SLC41}$ |
| · | $\Delta P_{SLC42}$ |
| MEDIUM | · |
| · | · |
| LARGE | · |

FIG. 20

| SHIFT LEVER | TRANSMISSION | CLUTCHES | | BRAKES | | | | ONE-WAY CLUTCHES | | SPEED RATIO |
|---|---|---|---|---|---|---|---|---|---|---|
| | | $C_1$ | $C_2$ | $B_1$ | $B_2$ | $B_3$ | $B_4$ | $F_1$ | $F_2$ | |
| NEUTRAL | N | | | | | | | | | — |
| REVERSE | Rev | | ○ | | | | ○ | | | −4.550 |
| DRIVE | 1st | ○ | | | | | ● | | ○ | 3.357 |
| | 2nd | ○ | | | ○ | ○ | | | | 2.180 |
| | 3rd | ○ | | ● | ○ | | | ○ | | 1.424 |
| | 4th | ○ | ○ | | ○ | | | | | 1.000 |

HYBRID VEHICLE DRIVE SYSTEM
INCLUDING CONTROLLABLE DEVICE
BETWEEN ENGINE AND ELECTRIC
MOTOR AND VEHICLE DRIVE WHEELS,
AND APPARATUS FOR CONTROLLING THE
DEVICE DEPENDING UPON SELECTED
OPERATION MODE OF THE SYSTEM

This application is based on Japanese Patent Applications No. 8-66516 filed Mar. 22, 1996, No. 8-70371 filed Mar. 26, 1996 and No. 8-220248 filed Aug. 22, 1996, the contents of which are incorporated hereinto by reference.

CROSS REFERENCE TO RELATED APPLICATIONS

U.S. patent applications No. 08/685,102 filed Jul. 22, 1996 now U.S. Pat. No. 5,789,882, and No. 08/746,483 filed Nov. 12, 1996, now U.S. Pat. No. 5,856,709.

BACKGROUND OF THE INVENTION

1. Field of the Invention

The present invention relates in general to a hybrid drive system for driving a motor vehicle, and more particularly to an apparatus for controlling a controllable device disposed between an engine and an electric motor as a drive power source and vehicle drive wheels, so that the controllable device is controlled with a reduced shock.

2. Discussion of the Related Art

For driving a motor vehicle, there is known a hybrid drive system including, as a drive power source, an engine operated by combustion of a fuel and an electric motor for a motor vehicle operated with an electric energy, and further including a controllable device such as an automatic transmission, which is disposed between the drive power source and drive wheels of the vehicle. An example of such a hybrid vehicle drive system is disclosed in JP-A-7-67208.

In such a hybrid vehicle drive system, at least one of the engine and the electric motor is selectively operated to drive the motor vehicle in a selected one of a plurality of different running modes, depending upon the running or operating condition of the vehicle, so as to minimize the fuel economy or exhaust gas emissions from the engine. The running modes of the vehicle correspond to respective operation modes of the hybrid drive system, which includes: a an engine drive mode in which the vehicle is driven by the engine; a motor drive mode in which the vehicle is driven by the electric motor; an engine-motor drive mode in which the vehicle is driven by both of the engine and the electric motor; and an engine drive+charging mode in which the vehicle is driven by the engine while the electric motor is operated as an electric generator for charging an electric energy storage device.

The automatic transmission, which is a controllable device in the hybrid drive system, may be an automatic transmission which has a plurality of operating positions having different speed ratios and which is shifted to an appropriate one of the operating positions by selective engagement and disengagement of coupling means such as clutches and brakes. Alternatively, the automatic transmission may be a continuously variable transmission whose speed ratio can be changed continuously. The automatic transmission may be controlled on the basis of an input torque thereof.

For instance, the automatic transmission having two or more operating positions is shifted from one position to another by engaging one coupling means while at the same time releasing another coupling means. This shifting action of the transmission is referred to as "clutch-to-clutch shifting action", where appropriate. In a motor vehicle equipped with an automatic transmission and using an engine as the sole drive power source, it is widely practiced to estimate the input torque of the transmission, and control the engaging force of the coupling means depending upon the estimated input torque, so as to reduce a shifting shock of the transmission when the clutch-to-clutch shifting action takes place. Such a technique is disclosed in JP-A-3-176240, JP-A-5-77660, JP-A-5-164233 and JP-A-5-296323.

However, inaccurate estimation of the input torque of the automatic transmission results in inadequate shifting actions of the transmission with a shifting shock. The conventional hybrid vehicle drive system suffers from a shifting shock of an automatic transmission due to a variation in the input torque in the different operation modes in which different drive power sources are used.

The clutch-to-clutch shifting action of the automatic transmission may be controlled by a learning control technique, wherein the engaging force or forces of one or both of the two coupling means for effecting the present clutch-to-clutch shifting action is controlled on the basis of the engaging force learned in the past clutch-to-clutch engaging actions, so as to accommodate differences of the hydraulic shift control device between the hybrid drive systems of the individual motor vehicles, and chronological changes of the hybrid drive systems. Where the coupling means is a hydraulically operated frictional coupling device such as a brake or clutch, the learning control of the engaging force of the frictional coupling device is effected by learning control of the transient hydraulic pressure applied to the frictional coupling device during the clutch-to-clutch shifting action of the automatic transmission.

In the conventional learning control of the clutch-to-clutch shifting action of the automatic transmission, the engaging force of the coupling means is controlled in the same learning control method or manner, irrespective of the currently selected operation mode of the hybrid drive system (currently selected running mode of the vehicle). The conventional learning control therefore suffers from inadequate control of the engaging force of the coupling means due to variations in the inertia torque and output characteristics of the hybrid drive system depending upon the currently selected operation mode, whereby the clutch-to-clutch shifting action tends to have a high possibility of giving rise to a shifting shock of the transmission.

There is also known a hybrid drive system for a motor vehicle having front and rear drive wheels, wherein a torque distributing mechanism is disposed between the drive power source and the drive wheels, for controlling a ratio of distribution of a drive torque of the drive power source to the front and rear drive wheels. The torque distributing mechanism may be a center differential device using a planetary gear set, or a differential gear device of bevel gear type. The planetary gear set of the center differential device includes three rotary elements rotatable relative to each other and a differential limiting clutch connecting the two elements of the three rotary elements. The ratio of distribution of the drive torque by the torque distributing mechanism may be controlled by a learning control technique.

In the conventional learning control of the drive torque distribution to the front and rear drive wheels, the torque distribution ratio is controlled in the same learning control method or manner, irrespective of the currently selected operation mode of the hybrid drive system (currently selected running mode of the vehicle). The conventional learning control therefore suffers from inadequate control or change of the torque distribution ratio due to variations in the inertia torque and output characteristics of the hybrid drive system depending upon the currently selected operation mode.

SUMMARY OF THE INVENTION

It is therefore a first object of the present invention to provide an apparatus for controlling a controllable device in a hybrid drive system for a motor vehicle, depending upon a selected one of different operation modes of the drive system or different running modes of the vehicle.

It is a second object of the prevent invention to provide an apparatus for controlling an automatic transmission in a hybrid drive system for a motor vehicle, which apparatus permits adequate control of a shifting action of the automatic transmission, so as to meet the selected running mode of the vehicle.

It is a third object of the present invention to provide an apparatus for controlling a torque distributing mechanism in a hybrid drive system for a 4-wheel drive motor vehicle, which apparatus permits adequate control of a ratio of distribution of the vehicle drive torque to the front and rear drive wheels, depending upon the selected running mode of the vehicle.

The first object indicated above may be achieved according to a first aspect of the present invention, which provides a hybrid drive system for a motor vehicle, comprising: (a) a drive power source consisting of an engine operated by combustion of a fuel, and an electric motor operated with an electric energy, at least one of the engine and the electric motor being operated for running the motor vehicle in a plurality of running modes; (b) a controllable device disposed between the drive power source and drive wheels of the motor vehicle; and (c) a control device for controlling the controllable device on the basis of an input torque received by the controllable device. The control device comprises input torque estimating means for estimating the input torque of the controllable device depending upon a currently selected one of the plurality of running modes.

In the hybrid drive system of the present invention constructed as described above, the input torque of the controllable device can be accurately estimated by the control device, in an appropriate manner which corresponds to the presently selected running mode of the vehicle, irrespective of variations in the inertia torque of the engine and electric motor and the other fluctuating factors. Since the controllable device is controlled on the basis of the accurately estimated input torque, the controllable device is suitably and smoothly operated without an undesirable phenomenon.

The principle of the first aspect of this invention described above is applicable to various types of hybrid drive system equipped with the engine and the electric motor as the drive power source for driving the motor vehicle. At least one of the engine and the electric motor may be used as the drive power source, by selective connection and disconnection of appropriate power transmission paths by selective engagement and disengagement (releasing) of clutches, or by a synthesizer and distributor mechanism such as a planetary gear mechanism for synthesizing or distributing the outputs of the engine and electric motor, or by suitable means for using the electric motor as an auxiliary drive power source to assist the engine as a primary power source.

In a first preferred form of the first aspect of the invention, the controllable device comprises an automatic transmission having a plurality of operating positions having respective different speed ratios. The automatic transmission includes a plurality of coupling devices which are selectively engaged and released for selectively establishing the plurality of operating positions. In this case, the control device is adapted to control the coupling devices for at least one of shifting actions of the automatic transmission, on the basis of the input torque of the automatic transmission estimated by the input torque estimating means.

In one advantageous arrangement of the above first preferred form of the invention, the coupling devices are hydraulically operated coupling devices, and the control device further comprises pressure control means for controlling a hydraulic pressure of at least one of two coupling devices of the hydraulically operated coupling devices on the basis of the input torque estimated by the input torque estimating means. One of these two coupling devices is engaged while the other of the two coupling devices is released, for shifting the automatic transmission from one of the operating positions to another.

The hydraulically operated coupling devices may include clutches and brakes which are selectively engaged and released for selectively establishing the operating positions of the automatic transmission.

However, the automatic transmission may be a continuously variable transmission whose speed ratio is continuously variable. In this case, the continuously variable transmission is shifted on the basis of the estimated input torque.

In a second preferred form of the first aspect of the invention, the plurality of running modes include a motor drive mode in which the motor vehicle is driven by only the electric motor, and the input torque estimating means is adapted to estimate the input torque on the basis of an output torque of the electric motor as compensated by an inertia of the electric motor.

In a third preferred form of the first aspect of the invention, the plurality of running modes include an engine drive mode in which the motor vehicle is driven by only the engine, and the input torque estimating means is adapted to estimate the input torque on the basis of an output torque of the engine as compensated by an inertia and a torque loss of the engine.

In a fourth preferred form of the first aspect of the invention, the plurality of running modes include an engine·motor drive mode in which the motor vehicle is driven by both of the engine and the electric motor, and the input torque estimating means is adapted to estimate the input torque on the basis of an output torque of the engine as compensated by an inertia and a torque loss of the engine, and an output torque of the electric motor as compensated by an inertia of the electric motor.

In a fifth preferred form of the first aspect of the invention, the hybrid drive system further comprises an electric energy storage device for storing the electric energy with which the electric motor is operated, and the plurality of running modes include an engine drive and charging mode in which the motor vehicle is driven by the engine while the electric motor is operated as an electric generator for charging the electric energy storage device. In this case, the input torque estimating means is adapted to estimate the input torque on the basis of an output torque of the engine as compensated by an inertia and a torque loss of the engine, and a regenerative braking torque of the electric motor as compensated by an inertia of the electric motor. This concept is equally applicable to a hybrid drive system which includes a separate electric generator in addition to the electric motor.

The present hybrid drive system may include an automatic transmission, and a clutch which is disposed between the engine or electric motor and the automatic transmission and which is selectively engaged and released. In this case, the input torque estimating means is preferably adapted to take into account the amount of slipping of the clutch when the input torque of the automatic transmission is estimated.

The motor vehicle may include an auxiliary device such as an air conditioner which is driven by the engine or electric motor. In this case, the input torque estimating means is preferably adapted to take into account the operating state of the auxiliary device when the input torque of the automatic transmission is estimated.

It will be understood that the input torque estimating means may use any other parameters or variables which are likely to influence the input torque of the controllable device such as an automatic transmission.

The second object indicated above may be achieved according to a second aspect of this invention, which provides a hybrid drive system (10) for a motor vehicle, comprising: (a) a drive power source consisting of an engine operated by combustion of a fuel, and an electric motor operated with an electric energy, at least one of the engine and the electric motor being operated for driving the motor vehicle in a plurality of running modes; (b) an automatic transmission disposed between the drive power source and drive wheels of the motor vehicle; and (c) a shift control device for controlling at least one controllable variable of the automatic transmission, which at least one controllable variable influences a shifting action of the automatic transmission. The shift control device comprises learning control means for effecting a learning control of the at least one controllable variable in different manners corresponding to the plurality of running modes of the motor vehicle.

In the hybrid drive system constructed according to the second aspect of this invention, the learning control means of the shift control device is adapted to effect learning control of a controllable variable or variables of the automatic transmission in different manners depending upon the running modes of the motor vehicle, so that the shifting action of the automatic transmission can be adequately achieved without a shifting shock, owing to the optimum learning control of the variable or variables in each selected running mode, irrespective of variations in inertia torque and output characteristics of the engine and the electric motor.

The principle of the second aspect of the invention is also applicable to various types of hybrid drive system as described above with respect to the first aspect of the invention.

In a first preferred form of this second aspect of the invention, the automatic transmission has a plurality of operating positions having respective different speed ratios, and includes a plurality of coupling devices which are selectively engaged and released for selectively establishing the plurality of operating positions, and the shift control device is adapted to control the coupling devices for at least one of shifting actions of the automatic transmission.

In one advantageous arrangement of the above first preferred form of the invention, the coupling devices are hydraulically operated coupling devices such as clutches and brakes, and the learning control means includes pressure control means for effecting the learning control of a hydraulic pressure of at least one of two coupling devices of the hydraulically operated coupling devices in different manners corresponding to the plurality of running modes of the motor vehicle. In this case, the shift control device is arranged to control the two coupling device to effect a so-called "clutch-to-clutch" shifting action, such that one of the two coupling devices is engaged while the other of the two coupling devices is released, for shifting the automatic transmission from of the operating positions to another.

However, the automatic transmission whose shifting action is controlled by the learning control according to the second aspect of this invention may be a continuously variable transmission whose speed ratio is continuously variable.

In the above advantageous arrangement, the learning control means may have memory means for storing a plurality of data maps corresponding to the plurality of running modes of the motor vehicle, each of the data maps representing a relationship between an operating parameter of the automatic transmission and a compensating value of the hydraulic pressure of each of the above-indicated at least one of the two coupling devices. In this arrangement, the learning control means determines the compensating value of the hydraulic pressure on the basis of the operating parameter and according to one of the data maps which corresponds to a currently selected one of the plurality of running modes. However, the data maps may be replaced by respective equations corresponding to the different running modes of the vehicle.

In the above arrangement, the learning control means may be adapted to update each of the data maps depending upon a condition in which the automatic transmission has been shifted from one of the plurality operating positions to another in the currently selected one of the plurality of running modes in the currently selected one of the plurality of running modes.

The condition used to update the data maps is selected depending upon the selected running mode. For example, where the two coupling devices are used to effect a clutch-to-clutch shift-up action of the automatic transmission such that one of these two coupling devices is engaged while the other coupling device is released, a tie-up phenomenon of these two coupling devices should be avoided during the shift-up action when the vehicle is run in the motor drive running mode in which only the electric motor is operated as the drive power source to drive the vehicle. The tie-up phenomenon is a condition in which the engaging action of one of the two coupling devices is effected at an excessively higher rate than the releasing action of the other coupling device. If the tie-up phenomenon is detected in the shift-up action, the data map corresponding to the motor drive running mode is updated to change the compensating value of the hydraulic pressure so as to prevent the tie-up phenomenon of the coupling devices during the subsequent shift-up action in the motor drive running mode.

On the other hand, the tie-up phenomenon is desirable in the engine drive running mode in which only the engine is operated as the drive power source, since the tie-up phenomenon is effective to prevent racing of the engine during the shift-up action in the engine drive running mode. If a sufficiently high tendency of the tie-up phenomenon is not detected in the shift-up action in the engine drive running mode, the data map corresponding to this running mode is updated to change the compensating value so as to increase the tendency of the tie-up phenomenon during the subsequent shift-up action in the engine drive running mode.

The tie-up phenomenon may be detected by monitoring the acceleration or rate of change of the acceleration of rotary members of the automatic transmission.

The shift control device may further comprise input torque estimating means for estimating the input torque of the automatic transmission, as the above-indicated operating parameter of the automatic transmission, depending upon the currently selected one of the plurality of running modes. In this instance, the learning control means determines the compensating value of the hydraulic pressure on the basis of the input torque estimated by the input torque estimating means and according to the data map corresponding to the currently selected running mode.

The learning control of the automatic transmission is desirably effected only when a predetermined condition is satisfied, for instance, only after the running condition of the vehicle in the selected mode has been stabilized, or only when the temperature of the oil in the automatic transmission is higher than a predetermined lower limit. The condition for effecting the learning control in one running mode may differ from that in another running mode.

Techniques for controlling the above-indicated clutch-to-clutch shifting action of an automatic transmission are disclosed in JP-A-5-296323 and JP-A-6-341535, except for the techniques for the learning control depending upon the currently selected running mode. Further, hydraulic control techniques for an automatic transmission are disclosed in JP-A-63-291738. The principle of the present invention may be practiced together with such techniques.

The third object indicated above may be achieved according to a fourth aspect of this invention, which provides a hybrid drive system for a motor vehicle having front and rear drive wheels, comprising: (a) a drive power source consisting of an engine operated by combustion of a fuel, and an electric motor operated with an electric energy, at least one of the engine and the electric motor being operated for driving the motor vehicle in a plurality of running modes; (b) a torque distributing mechanism disposed between the drive power source and the drive wheels of the motor vehicle, for distributing a drive torque produced by the drive power source to the front drive wheels and the rear drive wheels at a controllable distribution ratio; (c) torque distribution ratio changing means for controlling the torque distributing mechanism to change the distribution ratio of the drive torque; and (d) learning control means for effecting a learning control of a controllable variable of the torque distributing mechanism which influences the distribution ratio, when the distribution ratio is changed by the torque distribution ratio changing means. The learning control means is adapted to effect the learning control of the controllable variable in different manners corresponding to the plurality of running modes of the motor vehicle.

In the hybrid drive system constructed as described above according to the third aspect of this invention, the learning control of the controllable variable of the torque distributing mechanism which influences the ratio of distribution of the drive torque to the front and rear drive wheels is effected in different manners corresponding to the respective running modes of the motor vehicle, when the distribution ratio of the drive torque is changed by the torque distribution ratio changing means. Therefore, the variable of the torque distributing mechanism can be adequately controlled by the specific learning control method which meets the currently selected running mode, without a shock of the torque distributing mechanism, irrespective of variations in the inertia torque and output characteristics of the engine and electric motor.

The torque distributing mechanism may be a center differential device including a planetary gear set which has three rotary elements rotatable relative to each other, and a differential limiting clutch connecting two elements of the three rotary elements. The differential limiting clutch may be a hydraulically operated clutch whose hydraulic pressure is changed by the torque distribution ratio changing means. In this case, the learning control means may comprise pressure control means for effecting the learning control of the hydraulic pressure of the differential limiting clutch as the variable of the torque distributing mechanism, in different manners corresponding to the running modes of the vehicle, so that the distribution ratio of the drive torque by the center differential device is suitably controlled. The torque distribution ratio changing means is commanded to be operated to change the distribution ratio of the drive torque when a predetermined condition is satisfied, namely, on the basis of the yaw rate or the steering angle and running speed of the vehicle, and according to a predetermined torque distribution data map. which represents a relationship between the yaw rate (steering angle and running speed) and the optimum distribution ratio of the drive torque. The center differential device indicated above may be replaced by a bevel gear type differential device including a clutch for distribution of the drive torque to the front and rear drive wheels of a 4-wheel drive motor vehicle. The clutch used in the center differential device or differential gear device may be controlled so as to continuously change the torque to be transmitted to the drive wheels, or controlled to be either engaged or released.

Where the hydraulic pressure to be applied to the differential limiting clutch of the center differential device is controlled as the variable influencing the distribution ratio of the drive torque, the hydraulic pressure of a linear solenoid valve connected to the differential limiting clutch may be directly controlled by the learning control means to thereby indirectly control the hydraulic pressure of the differential limiting clutch for controlling the distribution ratio of the drive torque.

The present hybrid drive system according to the third aspect of the invention may further comprise learning control inhibiting means for inhibiting an operation of the learning control means from operating to effect the learning control of the controllable variable, in a predetermined running condition or conditions. For example, the operation of the learning control means is inhibited by the learning control inhibiting means, before a predetermined time has not passed after the currently selected running mode has been selected, or while the temperature of a working fluid for operating the torque distributing mechanism or the temperature of a coolant water for the engine is lower than a predetermined lower limit.

The learning control means may have memory means for storing a plurality of data maps corresponding to the plurality of running modes of the motor vehicle, each of the data maps representing a relationship between an operating parameter (e.g., input torque) of the center differential device and a compensating value of the hydraulic pressure of the differential limiting clutch. In this instance, the learning control means is adapted to determine the compensating value on the basis of the operating parameter and according to one of the data maps which corresponds to a currently selected one of the plurality of running modes. The learning control means may be adapted to update or change each of the data maps depending upon a condition in which the distribution ratio is changed by changing the hydraulic pressure of the differential limiting clutch by the pressure control means, in one of the running modes which corresponds to each data map.

BRIEF SUMMARY OF THE INVENTION

The above and other objects, features, advantages and technical and industrial significance of this invention will be better understood by reading the following detailed description of presently preferred embodiments of the invention, when considered in connection with the accompanying drawings, in which:

FIG. 3 is a block indicating operating states of various coupling elements for establishing different operating positions of an automatic transmission in the hybrid drive system of FIG. 1;

FIG. 7 is a view indicating nine operating modes which are selectively established in the sub-routine of FIG. 6;

FIG. 10 is a view indicating sets of various terms which are used for calculating estimated input torque values of the automatic transmission, in respective different operation modes of the hybrid drive system;

FIG. 12 is a view indicating a data map for determining a basic value $P_{SLU}*$ of hydraulic pressure $P_{SLU}$ of a linear solenoid valve SLU which is controlled by the automatic transmission controller according to the routine of FIG. 11;

FIG. 13 is a view indicating a data map for determining a compensating value $\Delta P_{SLU}$ used for learning control of the hydraulic pressure $P_{SLU}$, according to the routine of FIG. 11;

FIG. 17 is a view indicating a data map for determining a basic value $P_{SLC}*$ of hydraulic pressure $P_{SLC}$ of a linear solenoid valve SLC which is controlled by the hybrid drive controller according to the routine of FIG. 16;

FIG. 18 is a view indicating a data map for determining a compensating value $\Delta P_{SLC}$ used for learning control of of the hydraulic pressure $P_{SLC}$, according to the routine of FIG. 16.

FIG. 20 is a view indicating operating states of coupling elements for establishing operating positions of the automatic transmission in the hybrid drive system of FIG. 11.

DETAILED DESCRIPTION OF THE PREFERRED EMBODIMENTS

Figure 1:
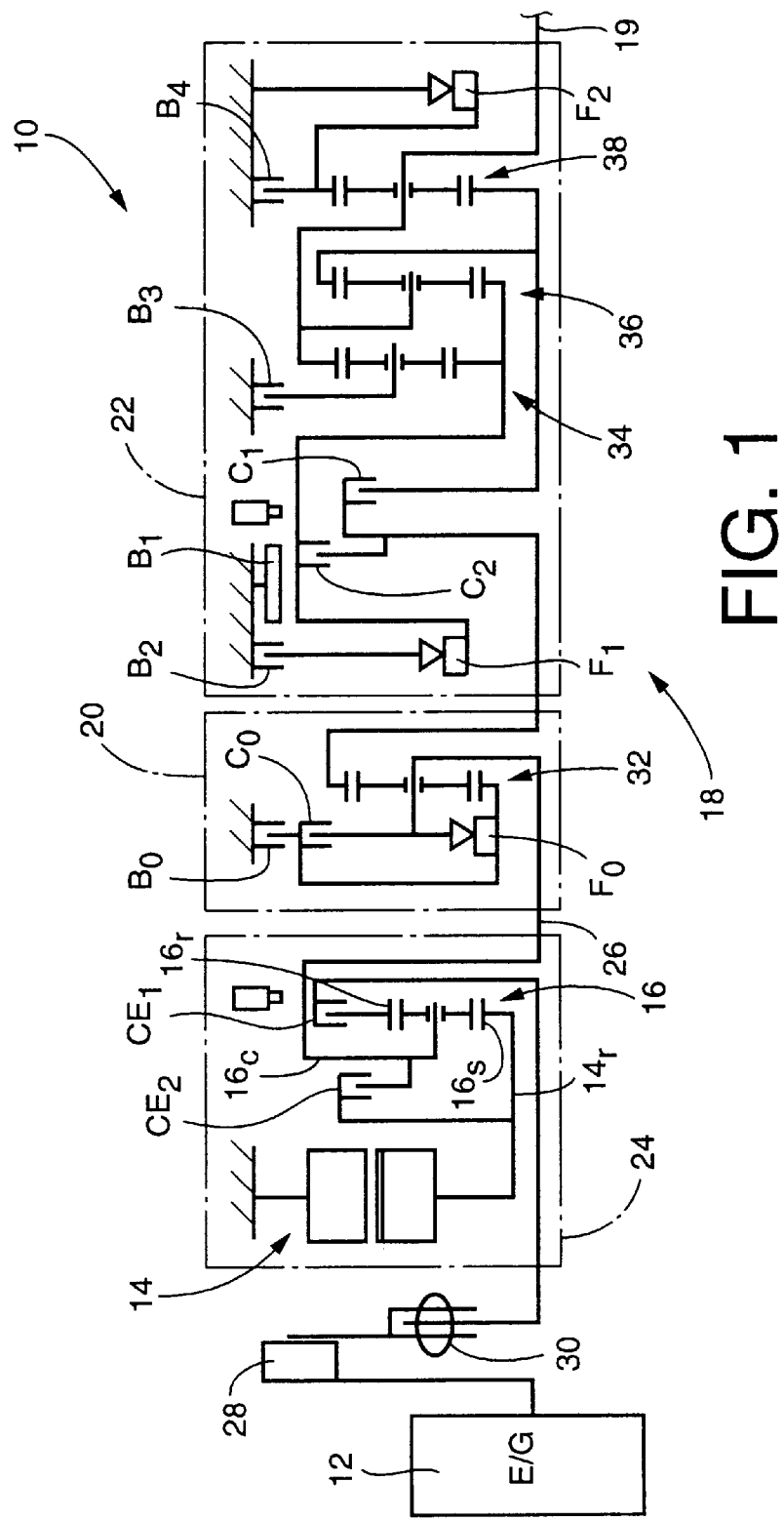
FIG. 1 is a schematic view illustrating a general arrangement of a hybrid drive system constructed according to a first embodiment of the present invention.

Referring first to the schematic view of FIG. 1, there is shown a hybrid drive system 10 adapted for use on a front-engine rear-drive motor vehicle (FR vehicle). The hybrid drive system 10 includes: an engine 12 such as an internal combustion engine, which is operated by combustion of a fuel; a motor/generator 14 which functions as an electric motor operated with an electric energy, and an electric generator; a planetary gear device 16 of single pinion type; and a power transmission device in the form of an automatic transmission 18. These engine 12, motor/generator 14, planetary gear device 16 and automatic transmission 18 are arranged in the longitudinal direction of the motor vehicle. The automatic transmission 18 has an output shaft 19 which is operatively connected to rear right and left drive wheels of the vehicle through a propeller shaft and a differential gear device (which are not shown), to transmit a drive force to the drive wheels.

The planetary gear device 16 functions as a synthesizing/distributing mechanism for mechanically synthesizing and distributing a force, and cooperates with the motor/generator 14 to constitute an electrically controlled torque converter 24 as indicated in one-dot chain line in FIG. 1. The planetary gear device 16 includes: a first rotary element in the form of a ring gear 16r connected to the engine 12 through a first clutch CE1; a second rotary element in the form of a sun gear 16s connected to a rotor shaft 14r of the motor/generator 14; and a third rotary element in the form of carrier 16c connected to an output shaft, which is an input shaft 26 of the automatic transmission 18. The sun gear 16s and carrier 16c are connected to each other through a second clutch CE2.

The engine 12 is connected to the first clutch CE1 through a flywheel 28 and a damper 30. The flywheel 28 and the damper 30 function to absorb speed and torque variations of the engine 12. The damper 30 includes an elastic member such as a spring or a rubber member. The first and second clutches CE1, CE2 are friction type multiple-disk clutches which are engaged and released by respective hydraulic actuators.

The automatic transmission 18 is a combination of a front auxiliary transmission 20 and a rear primary transmission 22. The auxiliary transmission 20 consists of an overdrive planetary gear set 32 of single pinion type, while the primary transmission 22 consists of three planetary gear sets 34, 36, 38 connected to each other. The primary transmission 22 has five forward-drive positions and one rear-drive position. The auxiliary transmission 20 includes frictionally coupling clutch C0 and brake B0 operated by respective hydraulic actuators, and a one-way clutch F0.

The primary transmission 22 frictionally coupling clutches C1, C2 and brakes B1, B2, B3, B4 which are operated by respective hydraulic actuators, and one-way clutches F1, F2.

Figure 2:
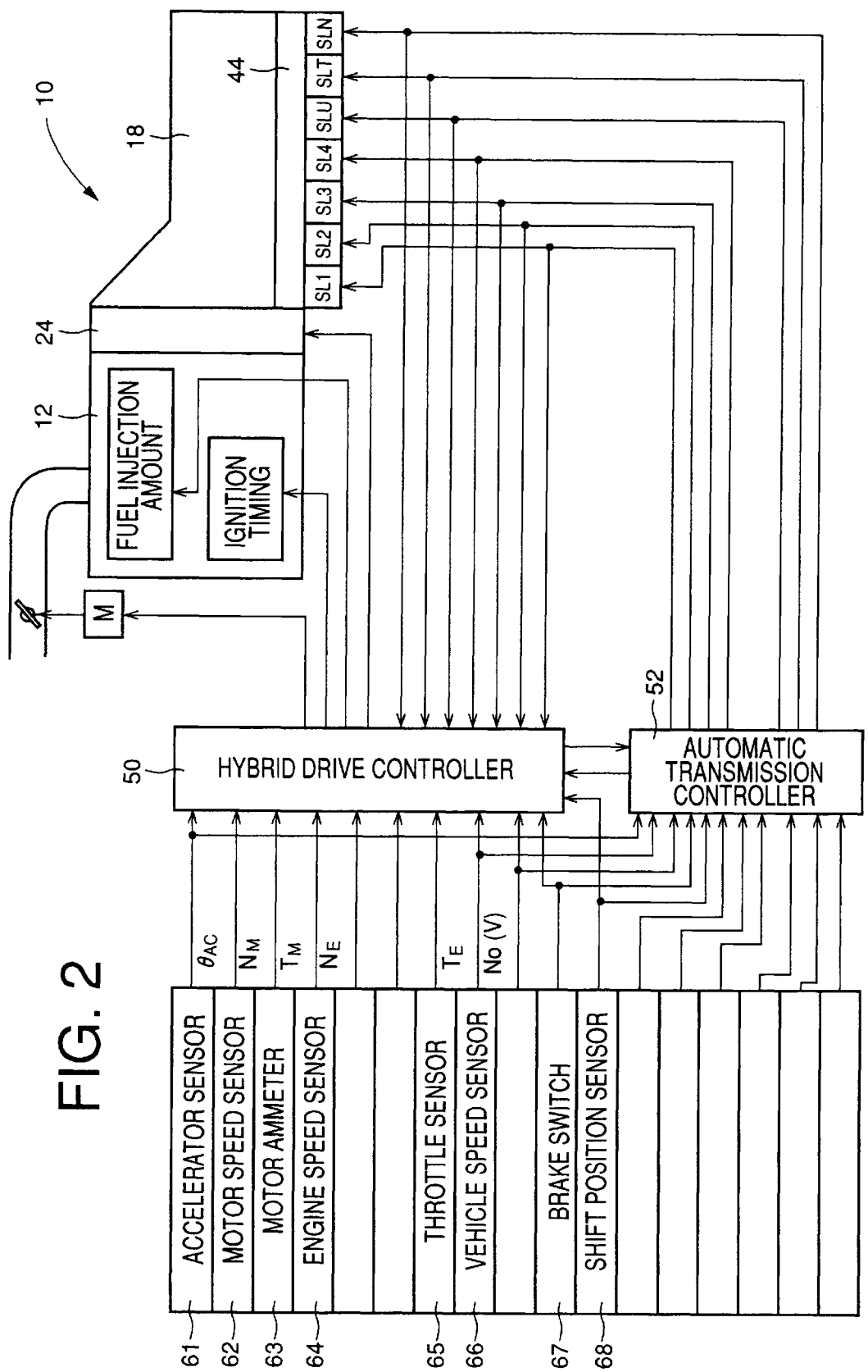
FIG. 2 is a view illustrating a control system used in the hybrid drive system of FIG. 1.

The automatic transmission 18 includes a hydraulic control device 44 incorporating solenoid-operated valves SL1–SL4 shown in FIG. 2. The solenoids of these solenoid-operated valves SL1–SL4 are selectively energized and deenergized to selectively engage and release the clutches C0, C1, C2 and brakes B0, B1, B2, B3, B4 for selectively establishing one of operating positions of the automatic transmission 18, as indicated in FIG. 3. The operating positions of the automatic transmission 18 consist of a neutral position "N", a rear-drive position "Rev", and five forward-drive positions, that is, first-speed position "1st", second-speed position "2nd", third-speed position "3rd", fourth-speed position "4th" and fifth-speed position "5th", as indicated in FIG. 3. The hydraulic control device 44 includes a manual shift valve which is mechanically connected to and operated by a shift lever. The clutches C0–C2 and brakes B0–B4 are controlled by the solenoid-operated valves SL1–SL4 and the manual shift valve. The shift lever has a parking position "P", a neutral position "N", a reverse position "R", a drive position "D", and engine braking positions such as a third-speed position "3", a second speed position "2" and a low-speed position "L".

Since the automatic transmission 18 and the electrically controlled torque converter 24 are symmetrical with respect to their centerline, only the upper halves of the transmission 28 and torque converter 24 are shown in FIG. 1.

In the table of FIG. 3, white circles indicate the engaged states of the clutches C, brakes B and one-way clutches F, while black circles indicate the engaged states of the clutch C0 and brakes B1, B4 when the shift lever is shifted to any one of the above-indicated engine braking positions. The absence of the white or black circles indicates the released states of the clutches C, brakes B and one-way clutches F.

The neutral and rear-drive positions "N", "Rev" of the automatic transmission 18 are established by the manual shift valve mechanically connected to the shift lever. When the shift lever is placed in any one of the engine braking positions, the transmission 18 is automatically shifted by the manual shift valve. When the shift lever 240 is placed in the drive position "D", the automatic transmission 18 is automatically placed in an appropriate one of the five forward-drive positions "1st" through "5th", with the solenoids of the solenoid-operated valves SL1–SL4 being selectively energized depending upon the running condition of the vehicle. The speed ratios of the five forward-drive positions of the automatic transmission 18 decrease in steps from the speed ratio of the first-speed position "1st" to the speed ratio of the fifth-speed position "5th", as indicated in FIG. 3, by way of example only. The fourth-speed position "4th" has a speed ratio $i_4$ which is equal to 1. The planetary gear set 32 of the auxiliary transmission 20 has a gear ratio $\rho$, which is the number of teeth $Z_S$ of the sun gear divided by the number of teeth $Z_R$ of the ring gear. The gear ratio $\rho$ is smaller than 1. The fifth-speed position "5th" has a speed ratio $i_5$ which is equal to $1/(1+\rho)$.

The rear-drive position "Rev" of the automatic transmission 18 has a speed ratio $i_R$ which is equal to $1-1/P_2 \cdot \rho_3$, where $\rho_2$ and $\rho_3$ represent the gear ratios of the planetary gear sets 36, 38, respectively. The speed ratios of the rear-drive and forward-drive positions of the automatic transmission 18 are indicated in the table of FIG. 3, for illustrative purpose only.

As is apparent from the table of FIG. 3, the shifting actions of the automatic transmission 18 between the second-speed and third-speed positions "2nd" and "3rd" are effected by simultaneous engaging and releasing actions of the second and third brakes B2, B3. Described more specifically, the shift-up action from the second-speed position "2nd" to the third-speed position "3rd" is achieved by engaging the second brake B2 while releasing the third brake B3, and the shift-down action from the third-speed position "3rd" to the second-speed position "2nd" is achieved by engaging the third brake B3 while releasing the second brake B2. These shifting actions are referred to as "clutch-to-clutch" shifting actions, where appropriate. To achieve the clutch-to-clutch shifting actions in a smooth fashion, the hydraulic control device 44 is constructed as described below by reference to FIG. 4.

Figure 4:
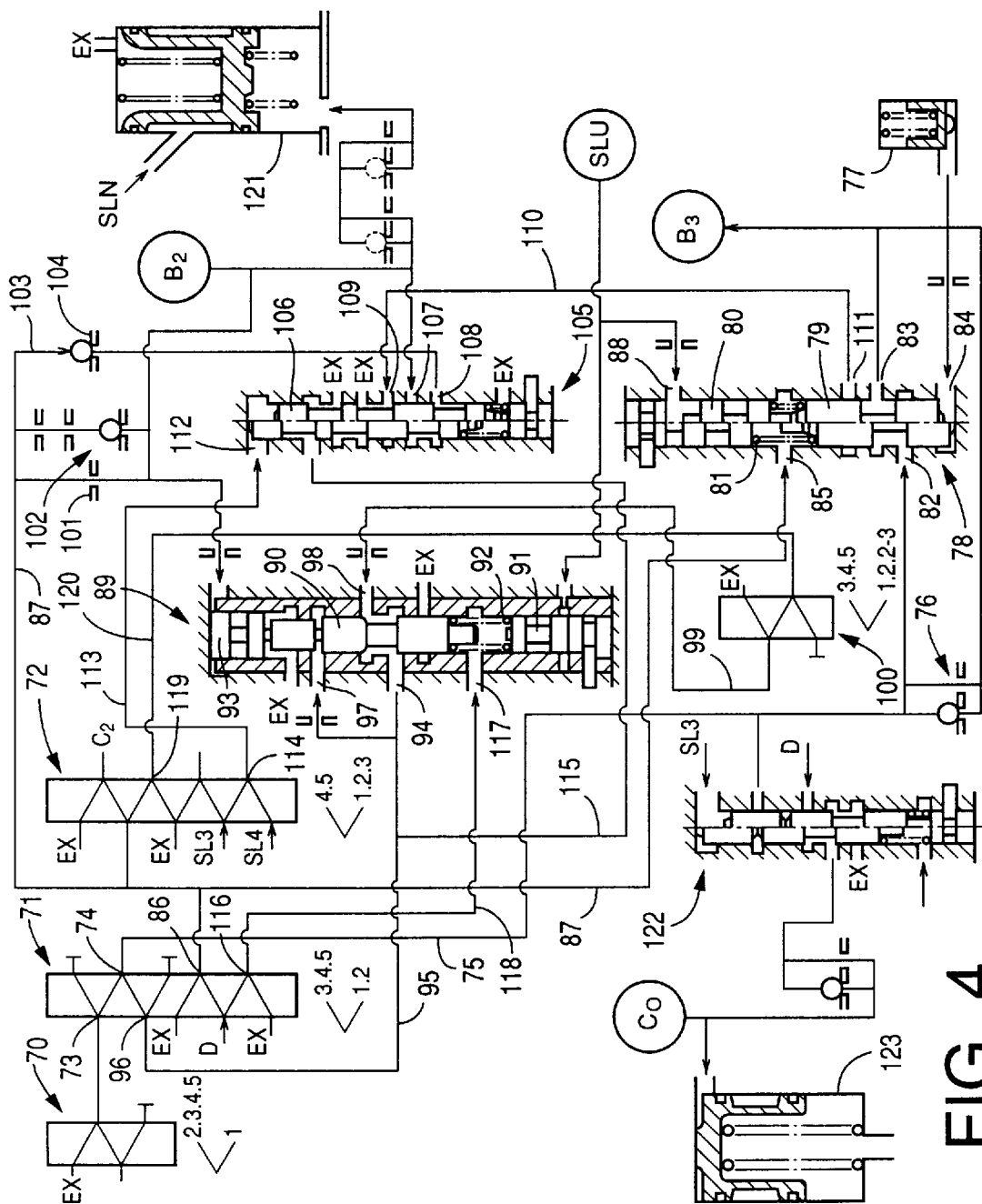
FIG. 4 is a view showing a part of a hydraulic system of the automatic transmission in the hybrid drive system of FIG. 1.

In FIG. 4, reference numerals 70, 71 and 72 denote a 1-2 shift valve, a 2-3 shift valve and a 3-4 shift valve, respectively. Working fluid communications of ports of these shift valves 70, 71, 72 are indicated below the shift valves as shown in FIG. 4 in which the five forward-drive positions "1st", "2nd", "3rd", "4th" and "5th" are represented as "1", "2", "3", "4" and "5", respectively.

The 2-3 shift valve 71 has an input port 73 and a brake port 74 which communicate with each other when the automatic transmission 18 is placed in the first-speed position "1st" or the second-speed position "2nd". The above-indicated third brake B3 is connected to the brake port 74 through an oil passage 75. The oil passage 75 has an orifice 76, and a damper valve 77 is connected between the orifice 76 and the third brake B3. The damper valve 77 functions to absorb a small amount of the working oil to thereby achieve a damping action upon an abrupt rise of a line pressure PL applied to the third brake B3.

Reference numeral 78 in FIG. 4 denotes a B-3 control valve which is provided to directly regulate the engaging pressure of the third brake B3. The B-3 control valve 78 includes a spool 79, a plunger 80, and a spring 81 disposed between the spool 79 and the plunger 80. The B-3 control valve 78 has an input port 82 which is opened and closed by the spool 79 and to which the oil passage 75 is connected, and an output port 83 which is selectively communicable with the input port 82 and to which the third brake B3 is connected. The output port 82 is connected to a feedback port 84 which is partially defined by one end of the spool 79.

The B-3 control valve 78 further has a port 85 communicating with a chamber in which the spring 79 is disposed. The 2-3 shift valve 71 has a port 86 which produces a hydraulic pressure output (line pressure PL) when the automatic transmission 18 is placed in one of the forward-drive positions "3rd", "4th" and "5th". The port 86 is connected to the port 85 of the B-3 control valve 78 through an oil passage 87. The B-3 control valve 78 further has a control port 88 adjacent to one end of the plunger 80, and a linear solenoid valve SLU (FIG. 2) is connected to the control port 88, so that a pilot pressure $P_{SLU}$ generated by the linear solenoid valve SLU is applied to the control port 88. In this arrangement, the hydraulic pressure is regulated by the B-3 control valve 78, on the basis of the elastic force of the spring 81 and the hydraulic pressure applied to the port 85. The elastic force of the spring 81 increases with an increase in the pilot pressure $P_{SLU}$ applied to the control port 88.

Reference numeral 89 in FIG. 4 denotes a 2-3 timing valve which includes a spool 90, a first plunger 91, a spring 92 disposed between the spool 90 and the first plunger 91, and a second plunger 93 disposed on the side of the spool 90 remote from the first plunger 91. the spool 90 has a small-diameter land and two large-diameter lands having a larger diameter than the small-diameter land. The 2-3 timing valve 89 has a port 94 formed at an intermediate portion thereof. An oil passage 95 is connected to the port 94, and to a port 96 of the 2-3 shift valve 71, which port 96 is communicated with the brake port 74 when the automatic transmission 18 is placed in one of the forward-drive positions "3rd", "4th" and "5th".

The oil passage 95 has a branch connected through an orifice to a port 97 of the 2-3 timing valve 89, which port 97 is open between the above-indicated small-diameter land one of the two large-diameter lands of the spool 90. The 2-3 timing valve 89 further has a port 98 which is selectively communicable with the above-indicated port 94 and which is connected through an oil passage 99 to a solenoid relay valve 100.

The 2-3 timing valve 89 further has a port which is adjacent to one end of the first plunger 91 and which is connected to the linear solenoid valve SLU, and another port which is adjacent to one end of the second plunger 93 and which is connected through an orifice to the second brake B2.

The above-indicated oil passage 87 is provided to supply the working oil to the second brake B2 and to discharge the oil from this second brake B2. The oil passage 87 is provided with an orifice 401 having a small diameter, and an orifice 102 with a check ball. The oil passage 87 has a branch 103 which is provided with an orifice 104 having a large diameter. The orifice 104 is provided with a check ball which is moved to an open position when the oil is discharged from the second brake B2. The branch 103 is connected to an orifice control valve 105 described below.

The orifice control valve 105 is provided to control the rate of discharge flow of the oil from the second brake B2. This orifice control valve 105 includes a spool 106, and has a port 107 at an intermediate position. The port 107 is opened and closed by the spool 106 and connected to the second brake B2. The orifice control valve 105 further has a port 108 formed at a position below the port 107 as seen in FIG. 4. The above-indicated branch 103 of the oil passage 87 is connected to the port 108. The orifice control valve 105 further has a port 08 formed at a position above the port 107 as seen in FIG. 4.

The port 108 is selectively communicable with a drain port and is connected through an oil passage 110 to a port 111 of the B-3 control valve 78. The port 111 is selectively communicable with the output port 83 to which the third brake B3 is connected.

The orifice control valve 105 further has a control port 112 formed adjacent to one end of the spool 106 remote from the spring which acts on the spool 106. This control port 112 is connected through an oil passage 113 to a port 114 of the 3-4 shift valve 72. This port 114 produces an output pressure of the third solenoid-operated valve SL3 when the automatic transmission 18 is placed in any one of the forward-drive positions "3rd", "2nd" and "1st", and produces an output pressure of the fourth solenoid-operated valve SL4 when the automatic transmission 18 is placed in the fourth-speed position "4th" or fifth-speed position "5th".

The oil passage 95 has a branch 115 which is connected to the orifice control valve 105. The branch 115 is selectively communicable with the drain port of the orifice control valve 105.

The 2-3 shift valve 71 has a port 116 which produces the hydraulic pressure output (line pressure PL) when the automatic transmission 18 is placed in the first-speed position "1st" or second-speed position "2nd". This port 116 is connected through an oil passage 118 to a port 317 of the 2-3 timing valve 89 which is open to a chamber in which the spring 92 is disposed. The 3-4 shift valve 72 has a port 119 which is communicated with the above-indicated oil passage 87 when the automatic transmission 18 is placed in any one of the positions "3rd", "2nd" and "1st". The port 119 is connected through an oil passage 120 to a solenoid relay valve 100.

Reference numeral 121 in FIG. 4 denotes an accumulator for the second brake B2. The accumulator 121 has a back-pressure chamber to which is applied an accumulator control pressure which is regulated on the basis of an output pressure of a linear solenoid valve SLN (FIG. 2) such that the accumulator control pressure increases with a decrease in the output pressure of the linear solenoid valve SLN. Accordingly, the hydraulic pressures for engaging and releasing the second brake B2 increase as a pilot pressure applied to the linear solenoid valve SLN decreases.

Reference numeral 122 in FIG. 4 denotes a C-0 exhaust valve, and reference numeral 123 denotes an accumulator for the clutch C0. The C-0 exhaust valve 122 is operated to place the clutch C0 in the engaged state for applying an engine brake to the vehicle when the automatic transmission 18 is shifted to the second-speed position "2nd" while the shift lever is placed in the position "2".

In the hydraulic control device 44 constructed as described above, the engaging pressure of the third brake B3 can be regulated directly by the B-3 control valve 78 when the port 111 of the B-3 control valve 78 is drained. The B-3 control valve 78 is controlled by the linear solenoid valve SLU to regulate the engaging pressure of the third brake B3.

When the spool 106 of the orifice control valve 105 is placed in its left position as indicated in FIG. 4, the working fluid can be discharged from the second brake B2 through the orifice control valve 105, and the releasing speed of the second brake B2 can be controlled by the controlled rate of flow of the fluid through the orifice control valve 105.

The clutch-to-clutch shift-up action of the automatic transmission 18 from the second-speed position "2nd" to the third-speed position "3rd" is effected by slowing releasing the third brake B3 while at the same time slowly engaging the second brake B2. To effectively reduce a shifting shock upon this clutch-to-clutch shift-up action, the hydraulic pressure of the third brake B3 during its releasing action is controlled by the linear solenoid valve SLU on the basis of an input torque of the input shaft 26 of the automatic transmission 18 which is estimated prior to the shift-up action.

As shown in FIG. 2, the hybrid drive system 10 includes a hybrid drive controller 50 as well as the automatic transmission controller 52 indicated above. Each of these controllers 50, 52 is constituted principally by a microcomputer incorporating a central processing unit (CPU), a random-access memory (RAM), and a read-only memory (ROM). The controllers 50, 52 receive output signals of various detectors or sensors which include: an accelerator sensor 61 for detecting an operating amount $\theta_{AC}$ of an accelerator pedal; a motor speed sensor 62 for detecting speed $N_M$ of the motor/generator 14; a motor ammeter 63 for detecting an electric current of the motor/generator 14, which indicates torque $T_M$ of the motor 14; an engine speed sensor 64 for detecting speed $N_E$ of the engine 12; a throttle sensor 65 for detecting the opening angle of a throttle valve, which indicates torque $T_E$ of the engine 12; a vehicle speed sensor 66 for detecting speed $N_O$ of the output shaft 19 of the automatic transmission 18, which indicates running speed V of the motor vehicle; a brake switch 67 for detecting an operation of a brake pedal; and a shift position sensor 68 for detecting the currently selected position of the shift lever.

The hybrid drive controller 50 is adapted to control the opening angle of the throttle valve, and the fuel injection and ignition timing of the engine 12, so that the output of the engine 12 is controlled depending upon the specific running condition of the vehicle.

Figure 5:
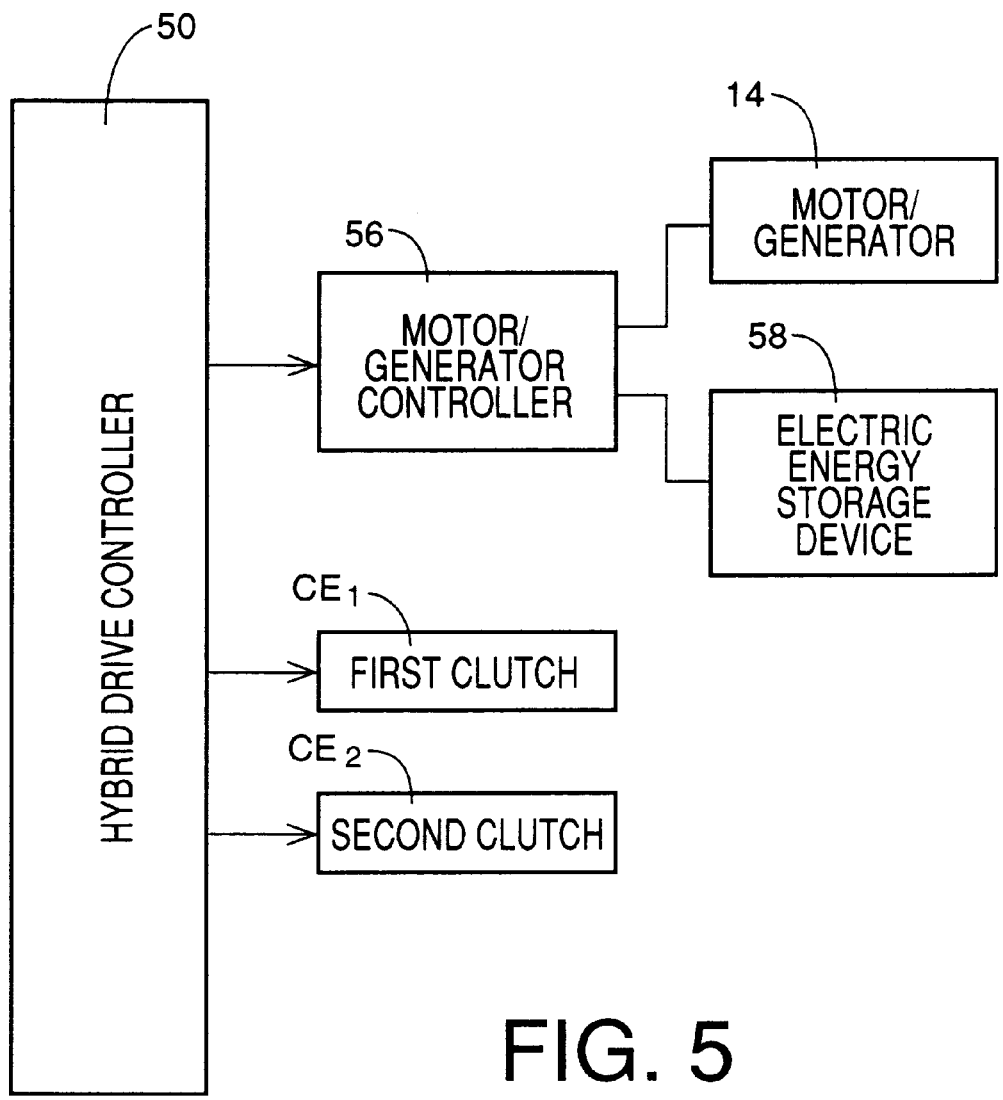
FIG. 5 is a block diagram showing connection between a hybrid drive controller and an electrically operated torque converter shown in FIG. 1.

The motor/generator 14 is connected to an electric energy storage device 58 through a motor/generator controller 56, as indicated in FIG. 5. The hybrid drive controller 50 is adapted to control the motor/generator controller 56 to place the motor/generator 14 selectively in one of a DRIVE state, a CHARGING state and a NON-LOAD or FREE state. In the DRIVE state, the motor/generator 214 is operated as an electric motor to provide a predetermined torque, with an electric energy being supplied thereto from the electric energy storage device 58. In the CHARGING state, the motor/generator 14 is operated as an electric generator or dynamo, by regenerative braking (i.e., electric braking torque of the motor/generator per se), so as to charge the electric energy storage device 58 with the electric energy. In the NON-LOAD or FREE state, the motor/generator 14 is placed in a non-load condition permitting free rotation of the rotor shaft 14r.

The first and second clutches CE1, CE2 are controlled by the hybrid drive controllers 50 through solenoid-operated valves of the hydraulic circuit. The automatic transmission 18 is controlled by the automatic transmission controller 252 through the above-indicated solenoid-operated valves SL1–SL4 and linear solenoid valves SLU, SLT and SLN of the hydraulic control device 44, so that the automatic transmission 18 is shifted to the optimum position depending upon the running condition of the vehicle, for example, depending upon the operation amount $\theta_{AC}$ of the accelerator pedal and the vehicle running speed V, and according to a selected one of predetermined shift patterns.

Figure 6:
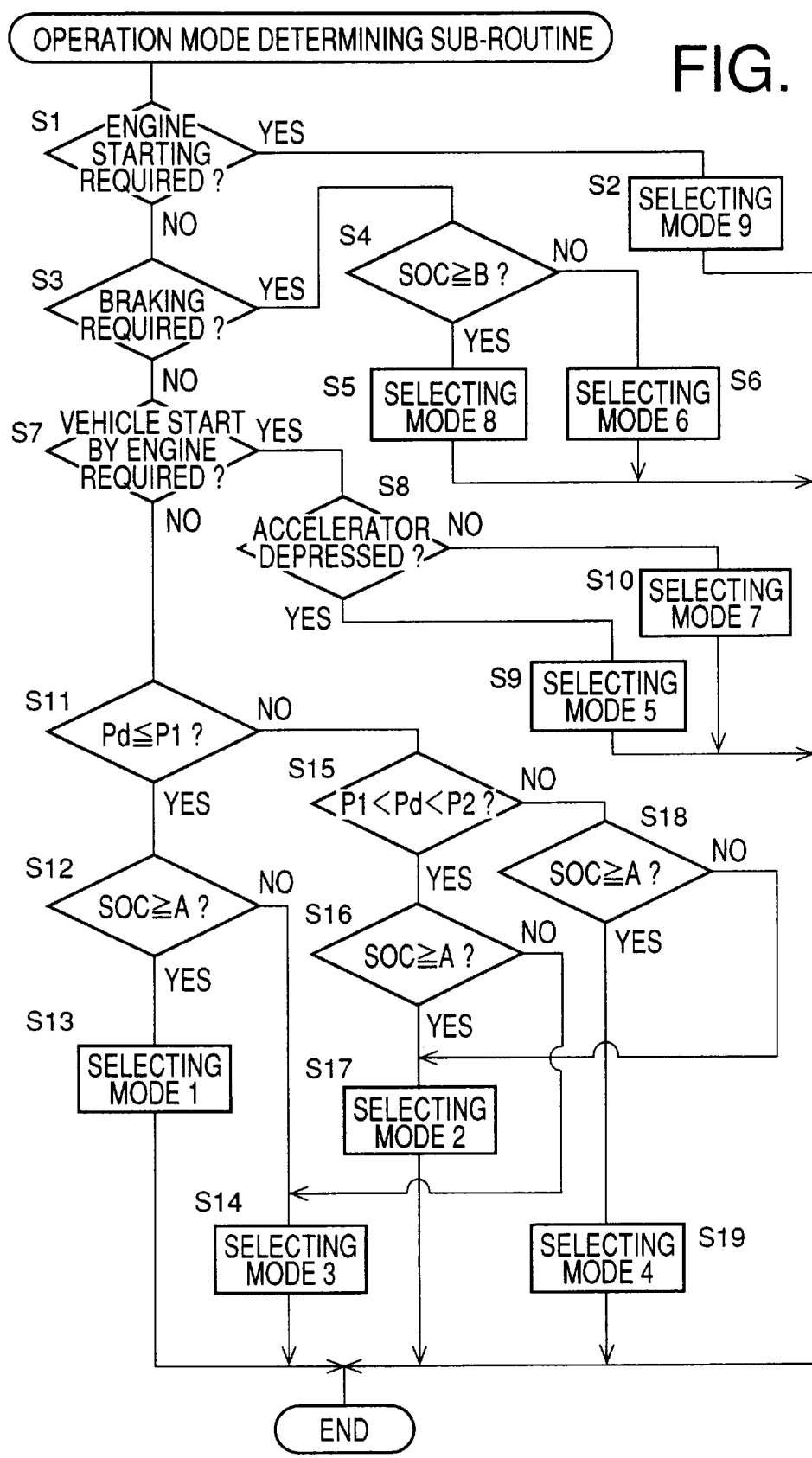
FIG. 6 is a flow chart illustrating an operation mode determining sub-routine executed by a hybrid drive controller of the hybrid drive system of FIG. 1.

The hybrid drive controller 50 is adapted to execute an operation mode determining sub-routine illustrated in the flow chart of FIG. 6, for selecting one of nine operation modes of the hybrid drive system 10 indicated in FIG. 7, and for operating the engine 12 and the electrically controlled torque converter 24 in the selected mode, as disclosed in U.S. patent application Ser. No. 08/746,483 filed Nov. 12, 1996. As shown in FIG. 2, the hybrid drive controller 250 is adapted to receive the output signals of the various sensors described above. The engine torque $T_E$ can be obtained from the opening of the throttle valve as detected by the throttle sensor 65, or from the amount of fuel injection into the engine 12. The motor torque $T_M$ can be obtained from the electric current of the motor/generator 14 as detected by the motor ammeter 265. An amount of electric energy SOC stored in the electric energy storage device 58 can be obtained from the electric current or charging efficiency of the motor/generator 14 when it is operated as the electric generator to charge the storage device 58.

The operation mode determining sub-routine of FIG. 6 is initiated with step S1 to determine whether there exists a command requiring the engine 12 to be started for driving of the vehicle with the motor/generator 14 as the drive power source as in an operation mode 1 in which the first clutch CE1 is in the released state, the first clutch CE1 is engaged, and the motor/generator 14 is operated so as to provide an output which is larger than the output necessary to drive the vehicle by a given surplus amount, so that the engine 12 is started by the surplus output of the motor/generator 14.

Even when the vehicle is running, the engine 12 can be started in the operation mode 9 by temporarily placing the automatic transmission 18 in the neutral position. Thus, the engine 12 can be started by the motor/generator 14. This arrangement eliminates an exclusive starter (e.g., electric motor) for starting the engine 12, whereby the hybrid drive system 10 is available at a reduced cost.

If a negative decision (NO) is obtained in step S1, that is, if no command requiring the starting of the engine 12 is present, the control flow goes to step S3 to determine whether brake application to the vehicle is required. For example, this determination may be effected by determining (a) whether a braking system of the vehicle is activated (whether the brake pedal has been depressed) or not, (b) whether the shift lever is placed in the engine braking position "L" or "2" with the operation amount $\theta_{AC}$ of the acceleration pedal being zero, or (c) whether the operation amount $\theta_{AC}$ of the accelerator pedal is zero. In the engine braking position "L" or "2", an engine brake is generally applied to the vehicle when the operation amount $\theta_{AC}$ of the accelerator pedal is zero.

If an affirmative decision (YES) is obtained in step S3, the control flow goes to step S4 to determine whether the amount of electric energy SOC stored in the electric energy storage device 58 is equal to or larger than a predetermined upper limit B. If an affirmative decision (YES) is obtained in step S4, the control flow goes to step S5 to select an operation mode 8. If a negative decision (NO) is obtained in step S4, the control flow goes to step S6 to select an operation mode 6. The upper limit B is an upper limit of the stored electric energy amount SOC below which the electric energy storage device 58 is permitted to be charged. The upper limit B is determined depending upon the charging and discharging efficiencies of the electric energy storage device 58. For instance, the upper limit B is about 80% of the full capacity of the electric energy storage device 58.

In the operation mode 8 selected in step S5, the first and second clutches CE1, CE2 are both engaged (turned ON), as indicated in the table of FIG. 7, and the motor/generator 14 is placed in the NON-LOAD state. Further, the engine 12 is turned OFF, that is, the throttle valve is closed, and the fuel injection amount if zeroed. As a result, an engine brake due to the drag resistance of the engine 12 is applied to the regenerative braking reduces the required amount of operation of the brake pedal and facilitates the control of the vehicle running.

In the operation mode 6 wherein the engine 12 is disconnected from the planetary gear device 16 with the first clutch CE1 placed in the released state, the energy loss of the vehicle due to the drag resistance of the engine 12 is prevented. Further, since the operation mode 6 is selected when the stored electric energy amount SOC is smaller than the upper limit B, the electric energy storage device 58 is protected from excessive charging and resulting deterioration of its charging and discharging efficiencies.

If a negative decision (NO) is obtained in step S3, that is, if no command requiring brake application to the vehicle is present, the control flow goes to step S7 to determine whether the vehicle is required to be started by operation of the engine 12. This determination may be effected by determining whether the vehicle is in a temporary stop during running of the vehicle with the engine 212 used as the drive power source as in an operation mode 3 (which will be described). For instance, the temporary stopping of the vehicle can be detected by checking if the output speed $N_O$ of the output shaft 19 of the automatic transmission 18 is zero. Namely, the output shaft speed $N_O$ is zero when the vehicle is stationary.

If an affirmative decision (YES) is obtained in step S7, the control flow goes to step S8 to determine whether the accelerator pedal is in a depressed state, more specifically, whether the operation amount $\theta_{AC}$ of the accelerator pedal is larger than a predetermined lower limit which is close to zero but larger than zero. If an affirmative decision (YES) is obtained in step S8, that is, if the accelerator pedal is in a depressed state, the control flow goes to step S9 to select an operation mode 5. If a negative decision (NO) is obtained in step S8, the control flow goes to step S10 to select an operation mode 7.

In the operation mode 5 selected in step S9, the first clutch CE1 is engaged (turned ON) and the second clutch CE2 is released (turned OFF), and the engine 12 is operated, as indicated in the table of FIG. 7, whereby the vehicle is started by the engine 12, with the regenerative braking torque of the motor/generator 14 being suitably controlled.

Described in detail, the ratios of the engine torque $T_E$, output torque of the planetary gear device 16 and motor torque $T_M$ are 1: $(1+\rho E)$ :$\rho E$, where $\rho E$ represents a gear ratio of the planetary gear device 16 ($\rho$=number of teeth of the sun gear 16s divided by number of teeth of the ring gear 16r). When the gear ratio $\rho E$ is about 0.5 (as in a common planetary gear device), for example, the torque of the motor/generator 14 is controlled to be equal to a half of the engine torque $T_E$, so that the torque about 1.5 times the engine torque $T_E$ is produced from the carrier 16c of the planetary gear device 16.

In the above arrangement, the vehicle can be started with a torque as large as $(1+\rho E)/\rho E$ times the torque of the motor/generator 14. If the motor/generator 14 is held in the NON-LOAD state with no current applied to the motor, the output of the carrier 16c is zeroed with the rotor shaft 14r merely rotating in the reverse direction, whereby the vehicle is held stationary.

In the above case, the planetary gear device 16 functions as a vehicle start clutch and a torque booster. With the motor torque $T_M$ (regenerative braking torque) gradually increased from zero to increase a reaction force of the motor/generator 14, the vehicle can be smoothly started with the output torque which is $(1+\rho)$ times the engine torque $T_E$.

The motor/generator 14 used in the hybrid drive system 10 of the present embodiment has a torque capacity which is about $\rho E$ times the maximum torque of the engine 12. Namely, the torque capacity and size of the motor/generator 14 are minimized to minimize the size and cost of manufacture of the hybrid drive system 10, while assuring the required torque.

The present hybrid drive system 10 is further adapted so that the opening angle of the throttle valve and the fuel injection amount are increased with an increase in the motor torque $T_M$, for preventing stalling of the engine 12 due to a drop of the engine speed $N_E$ due to an increase in the reaction force of the motor/generator 14.

In the operation mode 7 selected in step S10, the first clutch CE1 is engaged (turned ON) and the second clutch CE2 is released (turned OFF), and the engine 12 is operated while the motor/generator 14 is placed in the NON-LOAD state so that the hybrid drive system 10 is placed in an electrically neutral state, as indicated in the table of FIG. 7. In this operation mode 7, the output of the carrier 16c is zeroed with the rotor shaft 14r of the motor/generator 214 rotating freely in the reverse direction. When this operation mode 7 is established during running of the vehicle with the engine 12 operated as the drive power source as in the operation mode 3, the stopping of the vehicle does not require the engine 12 to be turned OFF, and the vehicle can be started by the engine 10 as in the operation mode 5.

If a negative decision (NO) is obtained in step S7, that is, if the starting of the vehicle by the engine 12 is not required, the control flow goes to step S11 to determine whether a currently required output Pd of the hybrid drive system 10 is equal to or smaller than a predetermined first threshold value P1. The currently required output Pd is an output of the hybrid drive system 210 required to drive the vehicle against a running resistance. This currently required output Pd is calculated according to a predetermined data map or equation, on the basis of the operation amount $\theta_{AC}$ of the accelerator pedal, a rate of change of this value $\theta_{AC}$, running speed of the vehicle (speed $N_O$ of the output shaft 19), or the currently established operating position of the automatic transmission 18.

The predetermined first threshold value P1 is a boundary value of the output above which the vehicle is driven with only the engine 12 used as the drive power source and below which the vehicle is driven with only the motor/generator 14 as the drive power source. In other words, the vehicle is considered to be in a medium-load or high-load running state if the currently required output Pd is larger than the first threshold value P1, and in a low-load running state if the currently required output Pd is equal to or smaller than the first threshold value P1. For example, the first threshold value P1 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is equal to or smaller than the first threshold value P1, the control flow goes to step S12 to determine whether the stored electric energy amount SOC is equal to or larger than a predetermined lower limit A. If an affirmative decision (YES) is obtained in step S12, the control flow goes to step S13 to select an operation mode 1. If a negative decision (NO) is obtained in step S12, the control flow goes to step S14 to select an operation mode 3.

The lower limit A is a lower limit of the stored electric energy amount SOC above which the electric energy stored in the storage device 58 can be used to operate the motor/generator 14 as the drive power source. The lower limit A is determined depending upon the charging and discharging efficiencies of the storage device 58. For instance, the lower limit A is about 70% of the full capacity of the storage device 58.

In the operation mode 1 selected in step S13, the first clutch CE1 is released (turned OFF) and the second clutch CE2 is engaged (turned ON), and the engine 12 is turned OFF, while the motor/generator 14 is operated so as to provide the currently required output Pd, as indicated in the table of FIG. 7, so that the vehicle is driven with only the motor/generator 14 used as the drive power source.

In this operation mode 1, too, the engine 12 is disconnected from the planetary gear device 16, so that the energy loss due to the drag resistance of the engine 12 is prevented as in the operation mode 6, and the motor can be suitably operated with high efficiency with the automatic transmission 18 being suitably shifted.

It is also noted that the operation mode 1 is selected, that is, the motor/generator 14 is used as the drive power source, when the currently required output Pd is equal to or smaller than the first threshold value P1 while the electric energy amount SOC stored in the storage device 58 is equal to or larger than the lower limit A. In this condition, the energy efficiency is higher and the fuel consumption and the amount of exhaust emissions can be made smaller when the vehicle is driven by the motor/generator 14 (in the operation mode 1) than when the vehicle is driven by the engine 12 (in the operation mode 2). Further, the electric energy storage device 58 is protected from excessive energy consumption with the stored electric energy amount SOC falling below the lower limit A, which would result in deterioration of the charging and discharging efficiencies of the storage device 58.

In the operation mode 3 selected in step S14, the first and second clutches CE1, CE2 are both engaged (turned ON), and the engine 12 is turned ON, while the motor/generator 14 is placed in the CHARGING state to charge the electric energy storage device 58 with regenerative braking, as indicated in the table of FIG. 7, whereby the vehicle is driven by the output of the engine 12 while the electric energy storage device 58 is charged with the electric energy generated by the motor/generator 14. In this operation mode 3, the engine 12 is operated so as to provide an output larger than the currently required output Pd, and the electric current of the motor/generator 14 is controlled so that a surplus output of the engine 12 is consumed by the motor/generator 14 to charge the storage device 258.

If a negative decision (NO) is obtained in step S11, that is, if the currently required output Pd is larger than the first threshold value P1, the control flow goes to step S15 to determine whether the currently required output Pd is smaller than a predetermined second threshold P2 which is larger than the first threshold P1, that is, whether the currently required output Pd is larger than the first threshold P1 and smaller than the second threshold P2, namely, within a predetermined range between P1 and P2.

This second threshold value P2 is a boundary value of the output below which the vehicle is driven with only the engine 12 used as the drive power source and above which the vehicle is driven with both the engine 12 and the motor/generator 14 as the drive power sources. In other words, the vehicle is considered to be in the medium-load running state if the currently required output Pd is smaller than the second threshold value P2, and in the high-load running state if the currently required output Pd is equal to or larger than the second threshold value P2. For example, the second threshold value P2 is determined by experiments, so as to minimize the exhaust gas emissions and the fuel consumption, depending upon the energy efficiency during running of the vehicle (in which the electric energy storage device 58 may be charged by operation of the engine 12).

If the currently required output Pd is larger than the first threshold P1 and smaller than the second threshold P2, that is, if an affirmative decision (YES) is obtained in step S15, the control flow goes to step S16 to determine whether the storage electric energy amount SOC is equal to or larger than the above-indicated predetermined lower limit A. If an affirmative decision (YES) is obtained in step S16, the control flow goes to step S17 to select an operation mode 2. If a negative decision (NO) is obtained in step S16, the control flow goes to step S14 to select the operation mode 3 discussed above.

If the currently required output Pd is equal to or larger than the second threshold P2, that is, if a negative decision (NO) is obtained in step S15, the control flow goes to step S18 to determine whether the stored electric energy amount SOC is equal to or larger than the lower limit A. If an affirmative decision (YES) is obtained in step S18, the control flow goes to step S19 to select an operation mode 4. If a negative decision (NO) is obtained in step S18, the control flow goes to step S17 to select the operation mode 2.

In the operation mode 2 selected in step S17, the first and second clutches CE1, CE2 are both engaged (turned ON), and the engine 12 is operated so as to produce the currently required output Pd, while the motor/generator 14 is placed in the NON-LOAD state, as indicated in FIG. 7, whereby the vehicle is driven with only the engine 12 used as the drive power source.

In the operation mode 4 selected in step S19, the first and second clutches CE1, CE2 are both engaged (turned ON), and the engine 12 and the motor/generator 14 are both operated, as indicated in the table of FIG. 7, whereby the vehicle is driven with both the engine 12 and the motor/generator 14 used as the drive power sources.

In the operation mode 4 selected when the currently required output Pd is equal to the second threshold P2 or larger, the engine 12 and the motor/generator 14 are both operated as the drive power sources to drive the vehicle, so that the energy efficiency is less likely to be lowered than in the operation mode 1 or 2 in which either the engine 12 or the motor/generator 14 is used as the drive power source. In this respect, the fuel consumption and the exhaust gas emissions can be made smaller in this operation mode 4 than in the operation mode 1 or 2 when the currently required output Pd is equal to the second threshold P2 or larger. Further, since the operation mode 4 is selected only when the stored electric energy amount SOC is equal to or larger than the lower limit A, the electric energy storage device 58 is protected from excessive energy consumption with the stored energy amount soc falling below the lower limit A, which would result in deterioration of the charging and discharging efficiencies of the storage device 58.

As described above, the operation modes 1–4 are selected in the following running states of the vehicle. When the electric energy amount SOC stored in the electric energy storage device 58 is not smaller than the lower limit A, the operation mode 1 is selected in step S13 to drive the vehicle with only the motor/generator 14 as the drive power source if the vehicle is in the low-load running state with the currently required output Pd being equal to or smaller than the first threshold P1. Further, the operation mode 2 is selected in step S17 to drive the vehicle with only the engine 12 as the drive power source if the vehicle is in the medium-load running state with the currently required output Pd being larger than the first threshold P1 and smaller than the second threshold P2, and the operation mode 4 is selected in step S19 to drive the vehicle with both of the engine 12 and the motor/generator 14 as the drive power sources if the vehicle is in the high-load running state with the currently required output Pd being equal to or larger than the second threshold P2.

When the stored electric energy amount SOC is smaller than the lower limit A, the operation mode 3 is selected in step S14 to drive the vehicle with only the engine 12 as the drive power source while at the same time charging the electric energy storage device 58 if the vehicle is in the medium-load running state with the currently required output Pd being smaller than the second threshold P2, and the operation mode 2 is selected in step S17 to drive the vehicle with only the engine 12 without charging the storage device 58 if the vehicle is in the high-load running state with the currently required output Pd being equal to or larger than the second threshold P2.

The operation mode 2 is selected in step S17 in the following two cases: 1) when the vehicle is in the medium-load running state wherein the currently required output Pd is larger than the first threshold P1 and smaller than the second threshold P2, while the stored electric energy amount SOC is not smaller than the lower limit A; and 2) when the vehicle is in the high-load running state wherein the currently required output Pd is equal to or larger than the second threshold P2, while the stored electric energy amount SOC is smaller than the lower limit A. In the medium-load running state of the vehicle, the energy efficiency is generally higher when the vehicle is driven by the engine 12 than when the vehicle is driven by the motor/generator 14. Accordingly, the fuel consumption and exhaust gas emission can be made smaller in the operation mode 2 than in the operation mode 1.

In the high-load running state, it is generally desirable to select the operation mode 4 in which the vehicle is driven by both of the engine 12 and the motor/generator 14. When the electric energy amount SOC stored in the electric energy storage device 58 is smaller than the lower limit A, however, it is desirable to select the operation mode 2, that is, to drive the vehicle with only the engine 12 used as the drive power source, in order to prevent deterioration of the charging and discharging efficiencies of the storage device 58 due to reduction of the stored electric energy amount SOC below the lower limit A.

The automatic transmission controller 52 is adapted to execute a routine for controlling the automatic transmission 18, on the basis of estimated values of torque of the automatic transmission in the four different operation modes 1–4 of the hybrid drive system 10, that is, in four different running modes of the vehicle. As described below in detail, the input torque values of the automatic transmission 18 in the different operation modes are estimated on the basis of respective sets of terms, as indicated in the table of FIG. 10.

Figure 8:
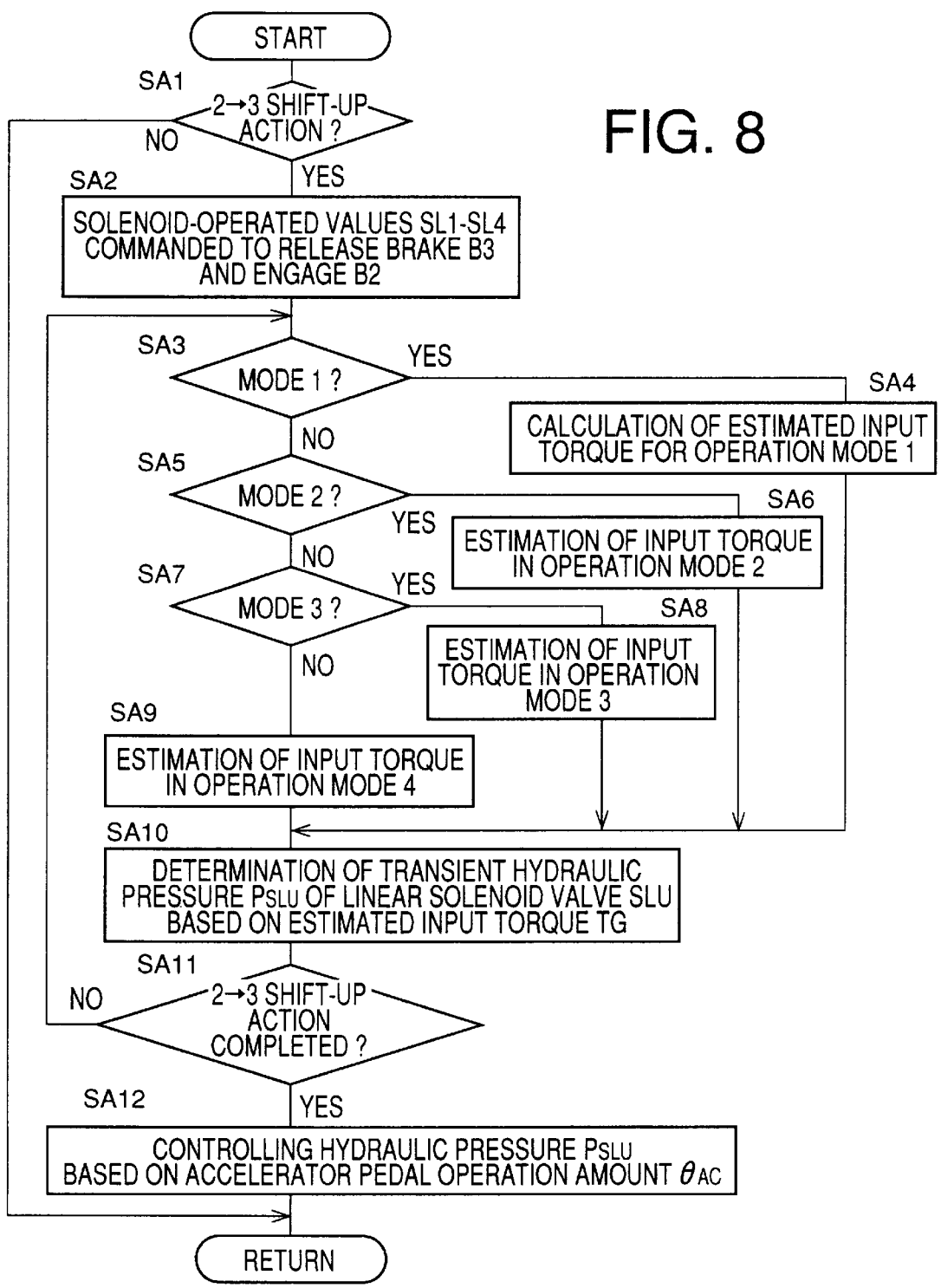
FIG. 8 is a flow chart illustrating a routine executed by an automatic transmission controller of the hybrid drive system.

The routine of FIG. 8 is initiated with step SA1 to determine whether the transmission 18 should be shifted up from the second-speed position "2nd" to the third-speed position "3rd". This determination is effected on the basis of the operation amount $\theta_{AC}$ of the accelerator pedal and the running speed V of the vehicle, and according to a predetermined 2→3 shift-up boundary line which represents a relationship between the accelerator pedal operation amount $\theta_{AC}$ and the vehicle speed V. If the point defined by the presently detected operation amount $\theta_{AC}$ and vehicle speed V moves across the 2→3 shift boundary line in a shift-up direction, the automatic transmission 18 should be shifted up from the position "2nd" to the position "3rd". The shifting action in question will be referred to as "2→3 shift-up action".

If an affirmative decision (YES) is obtained in step SA1, the control flow goes to step SA2 in which the automatic transmission controller 52 commands the solenoid coils of the solenoid-operated valves SL1–SL4 of the hydraulic control device 44 to be selectively energized and deenergized, so as to release the brake B3 and engage the brake B2, for initiating the 2→3 shift-up action of the transmission 18.

As a result, a hydraulic pressure $P_{B3}$ of the brake B3 begins to be reduced, while a hydraulic pressure $P_{B2}$ of the brake B2 begins to be increased. Step SA2 is followed by step SA3 and the following steps, so that the rate of reduction of the hydraulic pressure $P_{B3}$ is suitably controlled by the linear solenoid valve SLU until the 2→3 shift-up action is completed. The hydraulic pressure $P_{B2}$ and $P_{B3}$ during the 2→3 shift-up action of the transmission 18 (during gradual engaging and releasing actions of the brakes B2, B3) will be referred to as "transient hydraulic pressures $P_{B2}$, $P_{B3}$".

Step SA3 is provided to determine whether the operation mode 1 is currently selected, that is, whether the hybrid drive system 10 is placed in the motor drive mode for driving the vehicle with only the electric motor (motor/generator) 14 used as the drive power source.

If an affirmative decision (YES) is obtained in step SA3, the control flow goes to step SA4 in which an estimated value TG of the input torque of the automatic transmission 18 is calculated according to the following equation (1);

$$TG=T_M(I)+T_M(S)-T(H) \tag{1}$$

In the above equation (1), $T_M(I)$ represents an inertia torque of the motor/generator 14, $T_M(S)$ represents an output torque of the motor/generator 14, and T(H) represents a torque loss caused by an auxiliary device such as an air conditioner which is driven by the motor/generator 14.

The inertia torque $T_M(I)$ may be obtained from a suitable parameter such as a rate of change of the motor speed $N_M$ (acceleration of the motor/generator 14), according to a predetermined equation or data map stored in the automatic transmission controller 52. The output torque $T_M(S)$ may be obtained from a suitable parameter such as an electric current flowing through the motor/generator 14, according to a predetermined equation or data map stored in the controller 52. The torque loss T(H) of the auxiliary device may be obtained according to a predetermined equation stored in the controller 52, depending upon the operating state of the auxiliary device.

If a negative decision (NO) is obtained in step SA3, the control flow goes to step SA5 to determine whether the operation mode 2 is currently selected, that is, whether the hybrid drive system 10 is placed in the engine drive mode for driving the vehicle with only the engine 12 used as the drive power source.

If an affirmative decision (YES) is obtained in step SA5, the control flow goes to step SA6 in which the estimated value TG of the input torque of the automatic transmission 18 is calculated according to the following equation (2);

$$TG=T_E(I)+T_E(S)-T_E(E)-T(H) \tag{2}$$

In the above equation (2), $T_E(I)$ represents an inertia torque of the engine 12, $T_E(S)$ represents an output torque of the engine 12, and $T_E(E)$ represents a torque loss of the engine 12 caused by the use of the engine output for lubrication of the hybrid drive system 10. T(H) represents the torque loss of the auxiliary device, as described above.

The inertia torque $T_E(I)$ may be obtained from a suitable parameter such as a rate of change of the engine speed $N_E$ (acceleration of the engine 12), according to a predetermined equation or data map stored in the automatic transmission controller 52. The output torque $T_E(S)$ may be obtained from a suitable parameter such as the opening angle of the throttle valve or amount of fuel injection into the engine 12, according to a predetermined equation or data map stored in the controller 52. The torque loss of the engine 12 may be obtained from a suitable parameter such as the engine speed $N_E$, according to a predetermined equation or data map stored in the controller 52. In the operation mode 2, the rotor shaft 14 of the motor/generator 14 is rotated together with the input shaft 26 of the automatic transmission 18, it is desirable to take into account the inertia torque $T_M(I)$ of the motor/generator 14, for calculating the estimated torque TG of the automatic transmission 18.

If a negative decision (NO) is obtained in step SA5, the control flow goes to step SA7 to determine whether the operation mode 3 is currently selected, that is, whether the hybrid drive system 10 is placed in the engine drive+charging mode for driving the vehicle with only the engine 12 used as the drive power source, while the motor/generator 14 is operated to charge the electric energy storage device 58.

If an affirmative decision (YES) is obtained in step SA7, the control flow goes to step SA8 in which the estimated value TG of the input torque of the automatic transmission 18 is calculated according to the following equation (3);

$$TG = T_E(I) + T_M(I) + T_E(S)$$
$$-T_M(J) - T_E(E) - T(H) \quad (3)$$

In the above equation (3), $T_M(J)$ represents a torque loss caused by operation of the motor/generator 14 to charge the electric energy storage device 58. The torque loss may be a regenerative braking torque of the electric generator 14.

The inertia torque $T_E(I)$, output torque $T_E(S)$ and torque loss $T_E(E)$ of the engine 12, the inertia torque $T_M(I)$ of the motor/generator 14 and the torque loss T(H) of the auxiliary device may be obtained as described above with respect to steps SA4 and SA6. The torque loss $T_M(J)$ caused by the operation of the motor/generator to charge the electric energy storage device 58 may be obtained from a suitable parameter such as an electric current generated by the motor/generator 14 for charging the device 58, according to a predetermined equation or data map stored in the controller 52.

If a negative decision (NO) is obtained in step SA7, it means that the operation mode 4, namely, engine·motor drive mode is currently selected to drive the vehicle with both the engine 12 and the motor/generator 14. In this case, the control flow goes to step SA9 in which the estimated value TG of the input torque of the automatic transmission 18 is calculated according to the following equation (4);

$$TG = T_E(I) + T_M(I) + T_E(S)$$
$$+ T_M(S) - T_E(E) - T(H) \quad (4)$$

The terms in the above equation (4) may be obtained as described above with respect to steps SA4 and SA6.

It will be understood that a portion of the controller 52 assigned to implement steps SA3 through SA9 constitutes input torque estimating means for estimating the input torque of the automatic transmission 18 depending upon the currently selected or established operation mode of the hybrid drive system 10.

Figure 9:
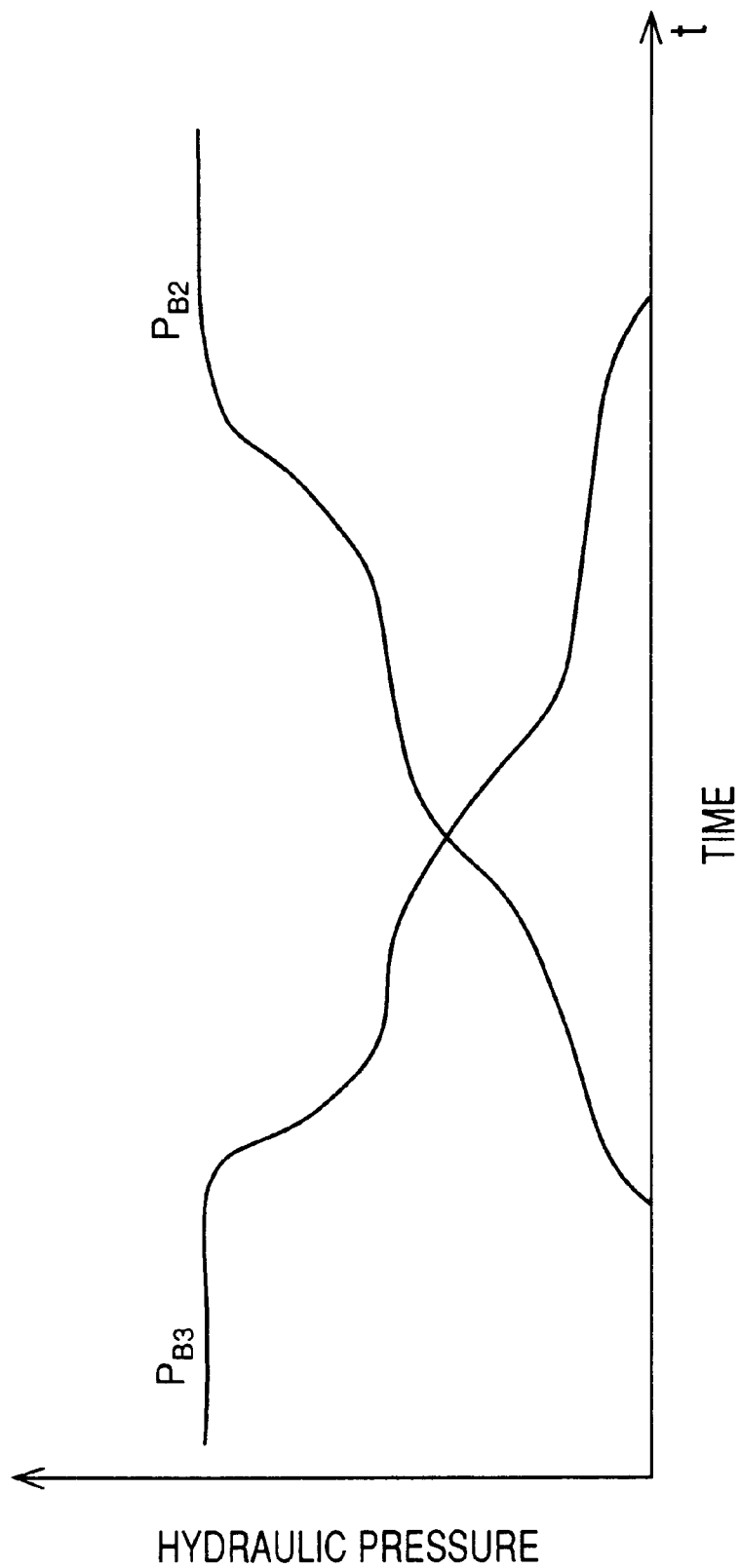
FIG. 9 is a time chart indicating changes of hydraulic pressure $P_{B2}$ of brake B2 and hydraulic pressure $P_{B3}$ of brake B3 of the automatic transmission, which are established according to the routine of FIG. 8.

Steps SA4. SA6, SA8 and SA9 are followed by step SA10 in which the transient hydraulic pressure $P_{SLU}$ of the linear solenoid valve SLU is determined on the basis of the estimated input torque TG of the automatic transmission 18 calculated in step SA4, SA6, SA8 or SA9, and according to a predetermined equation or data map stored in the controller 52, so that the transient hydraulic pressure $P_{B3}$ of the third brake B3 connected to the linear solenoid valve SLU is regulated as shown in FIG. 9 by way of example, during the 2→3 shift-up action of the automatic transmission 58.

Techniques for regulating the hydraulic pressure of a brake for an automatic transmission on the basis of an estimated input torque of the transmission are disclosed in JP-A-5-65843, JP-A-5-77660 and JP-A-5-164233. These techniques may be practiced in the present hybrid drive system 10.

It will be understood that a portion of the automatic transmission controller 52 assigned to implement step SA10 constitutes pressure control means for controlling the hydraulic pressure $P_{B3}$ of the brake B3 on the basis of the estimated input torque TG, during the 2→3 shift-up action of the automatic transmission 18.

Step SA10 is followed by step SA11 to determine whether the 2→3 shift-up action of the automatic transmission 18 is completed. This determination may be effected by determining whether the ratio of the rotating speed of the input shaft 26 to the rotating speed of the output shaft 19 becomes equal to the speed ratio of the third-speed position "3rd" of the transmission 18, or whether a timer has measured a predetermined time after the transmission 18 is commanded to be shifted up to the third-speed position "3rd". Steps SA3 through SA11 are repeatedly implemented until an affirmative decision (YES) is obtained in step SA11, whereby the rate of reduction of the transient hydraulic pressure $P_{B3}$ of the third brake B3, as indicated in FIG. 9.

If the affirmative decision (YES) is obtained in step SA11, the control flow goes to step SA12 in which the regulation of the hydraulic pressure $P_{SLU}$ for controlling the hydraulic pressure $P_{SLU}$ on the basis of the estimated input torque TG is terminated, and the hydraulic pressure $P_{SLU}$ is regulated to a value determined by the operation amount $\theta_{AC}$ of the accelerator pedal.

In the present hybrid drive system 10, the automatic transmission controller 52 is adapted to estimate the input torque of the automatic transmission 18 in the currently selected one of the four operation modes 1–4, according to an appropriate equation corresponding to the selected operation mode. Therefore, the input torque can be accurately estimated in the selected operation mode of the hybrid drive system 10 or in the selected running mode of the vehicle, irrespective of variations in the inertia torque of the engine 10 and motor/generator 14, for example. The present arrangement permits adequate regulation (i.e., reduction) of the transient hydraulic pressure $P_{B3}$ for effecting the 2→3 shift-up action of the automatic transmission 18 with a considerably reduced shifting shock.

While the present embodiment is arranged to regulate the transient hydraulic pressure $P_{B3}$ of the third brake B3 during the 2→3 shift-up action of the automatic transmission 18 on the basis of the estimated input torque TG, the principle of regulating the transient hydraulic pressure of a coupling device or devices (e.g., B2, B3) of the automatic transmission 18 on the basis of the estimated input torque TG is equally applicable to the other clutch-to-clutch shifting action of the transmission 18, for instance, to the shift-down action from the third-speed position "3rd" to the second-speed position "2nd".

The routine of FIG. 8 in the present embodiment is formulated to regulate only the transient hydraulic pressure $P_{B3}$ of the third brake B3 on the basis of the estimated input torque TG during the 2→3 shift-down action of the automatic transmission 18. However, the transient hydraulic pressure $P_{B2}$ of the second brake B2 may be regulated on the estimated input torque TG, as shown in FIG. 9, by way of example.

A clutch may be provided between the engine 12 or motor/generator 14 and the automatic transmission 18. In this case, the estimated input torque TG obtained from the various values such as the inertia torque $T_E(I)$ of the engine 12 as described above may be compensated on the basis of the amount of slipping of the clutch.

Figure 11:
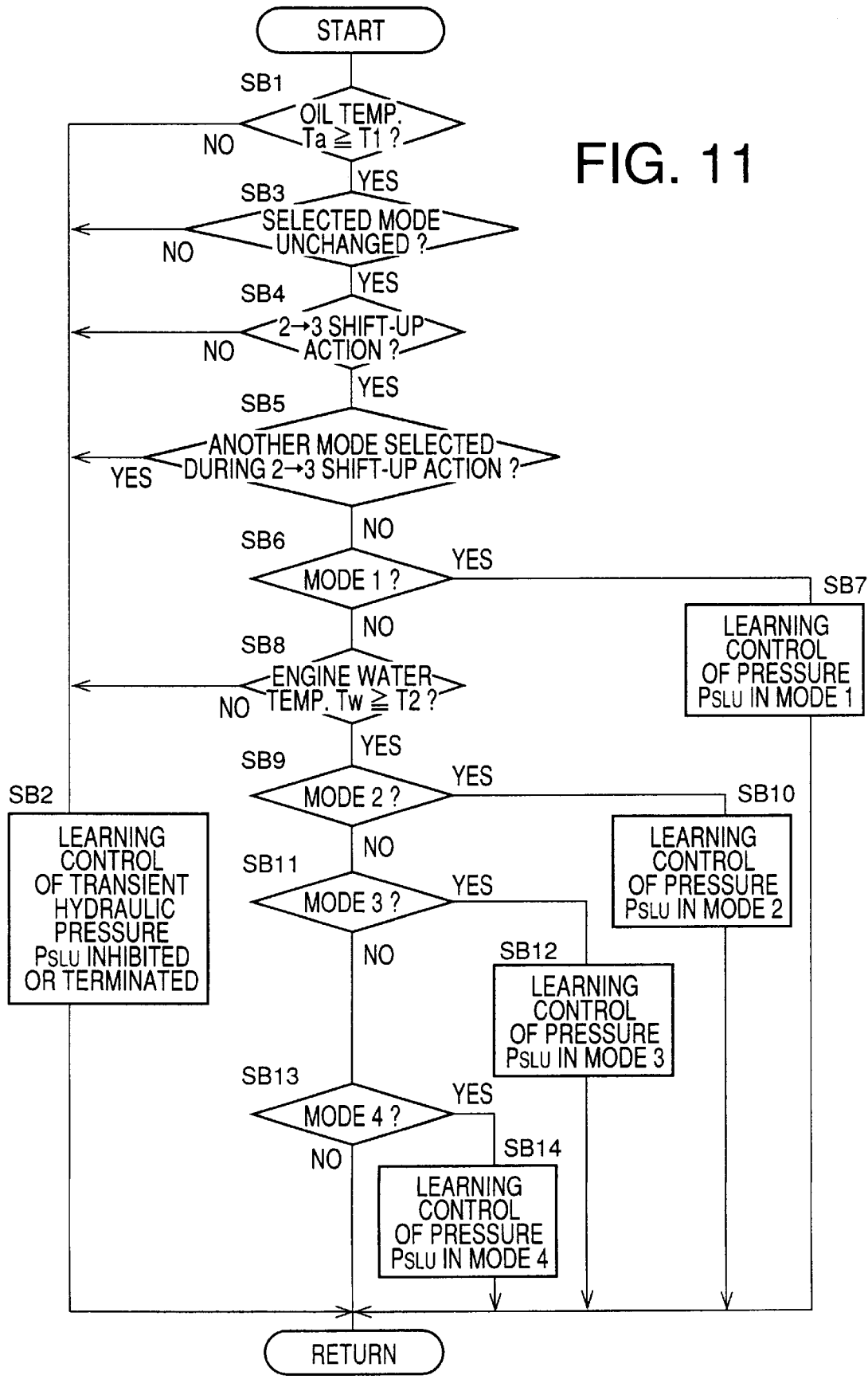
FIG. 11 is a flow chart illustrating a routine executed by the automatic transmission controller of a hybrid drive system constructed according to a second embodiment of this invention.

Referring to FIGS. 11–13, there will be described a second embodiment of this invention. In the present second embodiment, the automatic transmission controller 52 is adapted to execute a routine illustrated in the flow chart of FIG. 11, for effecting learning control of the automatic transmission 18, in different manners in the respective four different operation modes 1–4 of the hybrid drive system 10, that is, in four different running modes of the vehicle.

The routine of FIG. 11 is initiated with step SB1 to determine whether an oil temperature Ta (° C.) in the hydraulic control device 44 is equal to or higher than a predetermined threshold T1. This threshold T1 may be selected within a range of 60–70° C., for example.

If a negative decision (NO) is obtained in step SB1, the control flow goes to step SB2 to inhibit or terminate learning control of the transient hydraulic pressure $P_{SLU}$ of the linear solenoid valve SLU. Thus, the learning control of the transient hydraulic pressure $P_{SLU}$ according to the principle of the second embodiment is not effected when the oil temperature Ta is lower than the predetermined threshold T1, that is, when the fluidity of the oil flowing through the hydraulic control device 44 is considerably low. Therefore, the reliability of the learning control is improved.

If an affirmative decision (YES) is obtained in step SB1, the control flow goes to step SB3 to determine whether the currently selected operation mode of the hybrid drive system 10 is unchanged. This determination is effected by determining whether a predetermined time t1 has passed after the moment of selection of the currently selected operation mode. The time t1 is a time required for the torque of the input shaft 26 of the automatic transmission 18 to be stabilized. This time t1 changes with the selected operation mode, and is therefore for each of the operation modes. For instance, the time t1 is selected within a range of about 1–2 seconds.

If a negative decision (NO) is obtained in step SB3, the control flow goes to step SB2 to inhibit or terminate the learning control of the hydraulic pressure $P_{SLU}$. That is, the learning control is not effected before the time t1 has passed after the selection of the currently selected mode, namely, before the input torque of the automatic transmission 18 has been sufficiently stabilized. This arrangement also assures improved reliability of the learning control.

If an affirmative decision (YES) is obtained in step SB3, the control flow goes to step SB4 to determine whether the transmission 18 should be shifted up from the second-speed position "2nd" to the third-speed position "3rd". This determination is effected on the basis of the operation amount $\theta_{AC}$ of the accelerator pedal and the running speed V of the vehicle, and according to the predetermined 2→3 shift-up boundary line which represents a relationship between the accelerator pedal operation amount $\theta_{AC}$ and the vehicle speed V. If the point defined by the presently detected operation amount $\theta_{AC}$ and vehicle speed V moves across the 2→3 shift boundary line in the shift-up direction, the automatic transmission 18 should be shifted up from the position "2nd" to the position "3rd".

If a negative decision (NO) is obtained in step SB4, the control flow goes to step SB2 to inhibit or terminate the learning control. Thus, the learning control of the automatic transmission 18 is effected only when the automatic transmission 18 is in the 2→3 shift-up action.

If an affirmative decision (YES) is obtained in step SB4, the control flow goes to step SB5 to determine whether the operation mode has been changed. If an affirmative decision (YES) Is obtained in step SB5, the control flow goes to step SB2 to inhibit or terminate the learning control.

If a negative decision (NO) is obtained in step SB5, the control flow goes to step SB6 whether the operation mode 1 is currently selected, that is, whether the hybrid drive system 10 is placed in the motor drive mode for driving the vehicle with only the electric motor (motor/generator) 14 used as the drive power source.

If an affirmative decision (YES) is obtained in step SB6, the control flow goes to step SB7 in which the learning control of the hydraulic pressure $P_{SLU}$ is effected in a manner suitable for the operation mode 1 (motor drive mode). In step SB7, an estimated value TG of the input torque of the automatic transmission 18 is initially calculated according to the following equation (5);

$$TG = T_M(S) + T_M(I) \tag{5}$$

The output torque $T_M(S)$ and the inertia torque $T_M(I)$ of the motor/generator 14 may be obtained as described above with respect to the above equation (1). Then, a basic value $P_{SLU}^*$ and a compensating value $\Delta P_{SLU}$ which are used to calculate the hydraulic pressure $P_{SLU}$ of the linear solenoid valve SLU according to the following equation (6) are obtained on the basis of the estimated input torque value TG and according to predetermined data maps stored in the automatic transmission controller 52.

$$P_{SLU} = P_{SLU}^* + \Delta P_{SLU} \tag{6}$$

Thus, the hydraulic pressure $P_{SLU}$ of the linear solenoid valve SLU is determined. As a result, the transient pressure $P_{B3}$ of the third brake B3 connected to the linear solenoid valve SLU is initially lowered at a relatively high rate to the level corresponding to the determined hydraulic pressure $P_{SLU}$, as shown in FIG. 9.

An example of the data map used to calculate the basic value $P_{SLU}^*$ is illustrated in FIG. 12, while examples of the data maps used to calculate the compensating value $\Delta P_{SLU}$ is illustrated in FIG. 13. The data map of FIG. 12 represents a relationship between the estimated input torque TG and the basic value $P_{SLU}^*$ of the hydraulic pressure $P_{SLU}$. One of the four data maps of FIG. 13 is selectively used depending upon the currently selected one of the four operation modes 1–4. Each data map of FIG. 13 represents a relationship between the estimated input torque TG and the compensating value $\Delta P_{SLU}$. The basic value $P_{SLU}^*$ and the compensating value $\Delta P_{SLU}$ are obtained by interpolation between two adjacent values in the data maps, on the basis of the estimated input torque TG which generally falls between the two adjacent values in the data maps.

After the transient hydraulic pressure $P_{B3}$ of the third brake B3 is initially lowered at a relatively high rate, the hydraulic pressure $P_{SLU}$ is controlled so as to slowly reduce the transient hydraulic pressure $P_{B3}$ in the process of the 2→3 shift-up of the automatic transmission. Further, the compensating value $\Delta P_{SLU}$ is updated if necessary, after the 2→3 shift-up action is completed. To this end, the automatic transmission controller 50 is adapted to check if a tie-up phenomenon of the second and third brakes B2 and B3 takes place during the 2→3 shift-up action, that is, if the engaging action of the brake B2 occurs at a considerably higher rate than the releasing action of the brake B3. If the tie-up phenomenon is detected during the shift-up action, the hydraulic pressure $P_{SLU}$ is immediately lowered at a high rate, and the compensating value $\Delta P_{SLU}$ is updated in a direction to prevent the tie-up phenomenon. That is, the data map of FIG. 13 for the operation mode 1 is updated if the tie-up phenomenon is detected. In the operation mode 1 for driving the motor vehicle with the electric motor 14, the 2→3 shift-up action should not involve the tie-up phenomenon. However, the tie-up phenomenon is desirable in the operation mode 2 (engine drive mode), since the tie-up phenomenon prevents racing of the engine 12 during the 2→3 shift-up action.

The tie-up phenomenon of the brakes B2, B3 may be detected by a technique as disclosed in JP-A-5-296323. When the tie-up phenomenon is detected, the compensating value $\Delta P_{SLU}$ is reduced by a predetermined value, or changed to an optimum value for preventing the tie-up phenomenon. This optimum value may be calculated on the basis of the rates of change of the acceleration value of rotary members of the automatic transmission 18 which are used to detect the tie-up phenomenon, and according to a predetermined equation which includes the rate of change of the acceleration value.

If a negative decision (NO) is obtained in step SB6, that is, the currently selected operation mode is not the operation mode 1, the control flow goes to step SB8 to determine whether a water temperature Tw (° C.) of the engine 12 is equal to or higher than a predetermined threshold T2. This threshold T2 is selected within a range of 60–70° C.

If a negative decision (NO) is obtained in step SB8, that is, if the water temperature Tw is lower than the threshold T2 and the engine 12 has not been sufficiently warmed up, the control flow goes to step SB2 to inhibit or terminate the learning control of the automatic transmission 18. Thus, the learning control is not effected immediately after starting of the engine 12, namely, before the operation of the engine 12 has been stabilized. This arrangement is also effective to improve the reliability of the learning control.

If an affirmative decision (YES) is obtained in step SB8, the control flow goes to step SB9 determine whether the operation mode 2 is currently selected, that is, whether the hybrid drive system 10 is placed in the engine drive mode for driving the vehicle with only the engine 12 used as the drive power source.

If an affirmative decision (YES) is obtained in step SB9, the control flow goes to step SB10 in which the learning control of the hydraulic pressure $P_{SLU}$ is effected in a manner suitable for the operation mode 2. In step SB10, the estimated value TG of the input torque of the automatic transmission 18 is initially calculated according to the following equation (7):

$$TG=T_E(S)+T_E(I) \qquad (7)$$

The output torque $T_E(S)$ and the inertia torque $T_E(I)$ of the engine 12 are obtained as described above with respect to the equation (2).

Then, the basic value $P_{SLU}{}^*$ and the compensating value $\Delta P_{SLU}$ to calculate the hydraulic pressure $P_{SLU}$ of the linear solenoid valve SLU are obtained on the basis of the estimated input torque TG and according to the predetermined data maps, as in the same manner as described above with respect to step SB7. The transient hydraulic pressure $P_{B3}$ of the brake B3 is initially lowered according to the calculated hydraulic pressure $P_{SLU}$, and the compensating value $\Delta P_{SLU}$ is changed if necessary. That is, the data map of FIG. 13 for the operation mode 2 is updated as needed.

If a negative decision (NO) is obtained in step SB9, the control flow goes to step SB11 to determine whether the operation mode 3 is currently selected, that is, whether the hybrid drive system 10 is placed in the engine drive+ charging mode for driving the vehicle with only the engine 12 used as the drive power source, while the motor/generator 14 is operated to charge the electric energy storage device 58.

If an affirmative decision (YES) is obtained in step SB11, the control flow goes to step SB12 in which the learning control of the hydraulic pressure $P_{SLU}$ is effected in a manner suitable for the operation mode 3. Initially, the estimated value TG of the input torque of the automatic transmission 18 is calculated according to the following equation (8);

$$T=T_E(S)+T_E(I)+T_M(I)-T_M(J) \qquad (8)$$

In the above equation (3), $T_M(J)$ represents a torque loss caused by operation of the motor/generator 14 to charge the electric energy storage device 58.

The The torque loss $T_M(J)$ caused by the operation of the motor/generator to charge the electric energy storage device 58 may be obtained from a suitable parameter such as an electric current generated by the motor/generator 14 for charging the device 58, according to a predetermined equation or data map stored in the controller 52.

In step SB12, the basic value $P_{SLU}{}^*$ and the compensating value $\Delta P_{SLU}$ to calculate the hydraulic pressure $P_{SLU}$ are then obtained on the basis of the estimated input torque TG and according to the data maps of FIGS. 12 and 13, as described above with respect to step SB7. Accordingly, the transient pressure $P_{B3}$ of the brake B3 is initially lowered according to the calculated hydraulic pressure $P_{SLU}$, and the compensating value $\Delta P_{SLU}$ is changed if necessary. That is, the data map of FIG. 13 for the operation mode 3 is updated as needed.

If a negative decision (NO) is obtained in step SB11, the control flow goes to step SB13 to determine whether the operation mode 4, namely, engine·motor drive mode is currently selected to drive the vehicle with both the engine 12 and the motor/generator 14.

If an affirmative decision (YES) is obtained in step SB13, the control flow goes to step SB14 in which the learning control of the hydraulic pressure $P_{SLU}$ is effected in a manner suitable for the operation mode 4. That is, the estimated value TG of the input torque of the automatic transmission 18 is initially calculated according to the following equation (9);

$$TG=T_E(S)+T_E(I)+T_M(S)+T_M(I) \qquad (9)$$

Then, the basic value $P_{SLU}{}^*$ and the compensating value $\Delta P_{SLU}$ to calculate the hydraulic pressure $P_{SLU}$ are then obtained on the basis of the estimated input torque TG and according to the data maps of FIGS. 12 and 13, as described above with respect to step SB7. Accordingly, the transient pressure $P_{B3}$ of the brake B3 is initially lowered according to the calculated hydraulic pressure $P_{SLU}$, and the compensating value $\Delta P_{SLU}$ is changed if necessary. That is, the data map of FIG. 13 for the operation mode 4 is updated as needed.

It will be understood that a portion of the controller 52 assigned to implement steps SB6, SB7 and SB9–SB14 constitutes input torque estimating means for estimating the input torque of the automatic transmission 18 depending upon the currently selected or established operation mode of the hybrid drive system 10, and also learning control means for effecting learning control of a controllable variable in the form of the hydraulic pressure $P_{SLU}$ of the linear solenoid valve SLU (hydraulic pressure $P_{B3}$ of the third brake B3), depending upon the currently selected operation mode of the hybrid drive system 10. It will also be understood that steps SB7, SB10, SB12 and SB14 correspond to pressure control means for controlling the hydraulic pressure $P_{SLU}$, while steps SB1–SB3, SB5 and SB8 correspond to learning control inhibiting means for inhibiting the learning control of the hydraulic pressure $P_{SLU}$.

In the present second embodiment, the automatic transmission controller 52 is adapted to estimate the input torque of the automatic transmission 18 in the currently selected one of the four operation modes 1–4, according to an appropriate equation corresponding to the selected operation mode, and calculate the hydraulic pressure $P_{SLU}$ by obtaining the basic value $P_{SLU}^*$ and the compensating value $\Delta P_{SLU}$ on the basis of the estimated input torque value TG. Further, the compensating value $\Delta P_{SLU}$ is obtained according to one of the four data maps which corresponds to the currently selected operation mode of the hybrid drive system 10 or running mode of the vehicle. In addition, these data maps for the compensating values $1_{SLU}$ are updated depending upon the condition in which the 2→3 shift-up action of the automatic transmission 18 is effected in the different operation modes. Thus, the data maps for the compensating value $\Delta P_{SLU}$ used to control the transient hydraulic pressure $P_{B3}$ of the brake B3 are updated independently of each other in the different operation modes of the hybrid drive system 10, whereby the the 2→3 shift-up action can be achieved with a reduced shifting shock, irrespective of variations in the inertia torque and output torque of the engine 10 and motor/generator 14, for example.

In the present hybrid drive system 10, the learning control of the hydraulic pressure $P_{SLU}$ is inhibited when the operation mode is changed during the 2→3 shift-up action of the automatic transmission 18, or immediately after the new operation mode is selected, or before the operating condition of the transmission or engine has not been stabilized due to insufficiently low temperature of the oil in the transmission or the coolant water of the engine. Therefore, the updating of the data maps to change the compensating value $\Delta P_{SLU}$ for learning control of the hydraulic pressure $P_{SLU}$ is not effected in a transient state of the vehicle in which the inertia and output characteristics of the drive power source are not stable. This arrangement is effective to improve the reliability of the learning control of the hydraulic pressure $P_{SLU}$ and the hydraulic pressure $P_{B3}$ of the brake B3.

Figure 14:
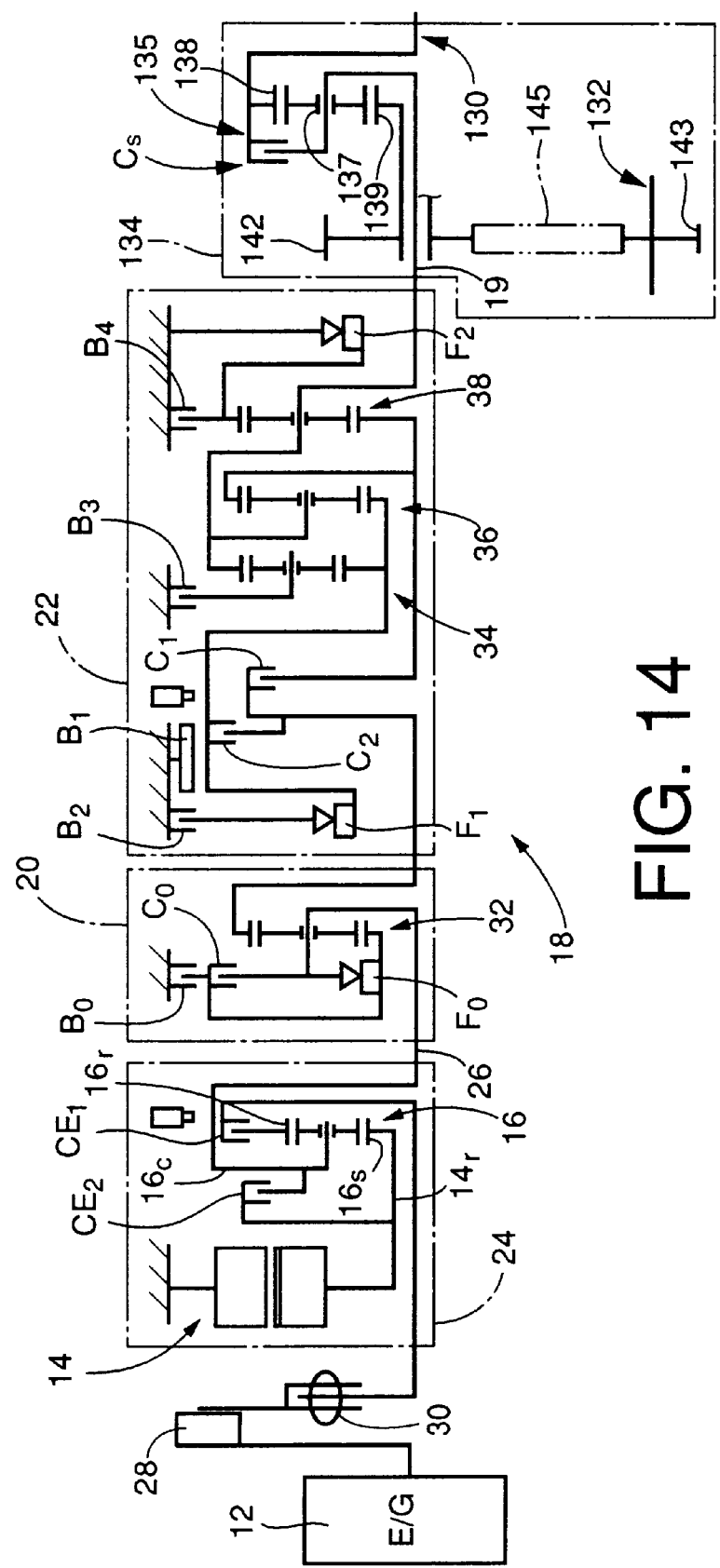
FIG. 14 is a schematic view illustrating a general arrangement of a hybrid drive system having a transfer or center differential device, which is constructed according to a third embodiment of the present invention.

Referring next to FIGS. 14–18, there will be described a hybrid drive system constructed according to a third embodiment of the present invention. This hybrid drive system, which is indicated generally at 128 in FIG. 14, is adapted to be used for a 4-wheel drive motor vehicle having front drive wheels and rear drive wheels. In this third embodiment, the automatic transmission controller 52 is also adapted to execute the routine illustrated in the flow chart of FIG. 11 for effecting the learning control of the hydraulic pressure $P_{SLU}$ to control the hydraulic pressure $P_{B3}$ of the brake B3, according to the data maps of FIGS. 12 and 13.

In the present hybrid drive system 128, the hybrid drive controller 50 is adapted to effect a learning control of a torque distribution mechanism in the form of a transfer mechanism or center differential mechanism 134 shown in FIG. 14.

The center differential mechanism 134 is arranged to receive an output torque To of the automatic transmission 18 through the output shaft 19. The center differential mechanism 134 is provided to control the ratio of distribution of the vehicle drive torque (output torque To of the automatic transmission 18) to the front and rear drive wheels through a front wheel drive shaft 130 and a rear wheel drive shaft 132, respectively. The center differential mechanism 134 includes a planetary gear set 135 coaxial with the output shaft 19 of the automatic transmission 18. The planetary gear set 135 incorporates a carrier 137 connected to the output shaft 19, and a ring gear 138 connected to the rear wheel drive shaft 132 which is coaxial with the output shaft 19.

The planetary gear set 135 further incorporates a sun gear 139 formed integrally with a driving sprocket wheel 142, which is disposed coaxially and radially outwardly of the output shaft 18. The front wheel drive shaft 132 is disposed in parallel with the output shaft 19, and has a driven sprocket wheel 143 fixed thereto. The driving and driven sprocket wheels 142, 143 are connected to each other by a chain 145.

Between the carrier 137 and the ring gear 138, there is disposed a differential limiting clutch Cs, which serves as a differential limiting mechanism. This differential limiting clutch Cs is a hydraulically operated wet-type multiple-disk clutch. That is, the engagement force of the differential limiting clutch Cs is controlled by a hydraulic pressure Pc applied thereto from a linear solenoid valve SLC of the hydraulic control device 44 shown in FIG. 15. The linear solenoid valve SLC is controlled by the hybrid drive controller 50 to change the hydraulic pressure Pc continuously or in steps.

The ratio of distribution of the vehicle drive torque to the front and rear drive wheels changes with a change in the hydraulic pressure Pc of the differential limiting clutch Cs. The hydraulic pressure Pc is controlled, as well known in the art. For example, the hydraulic pressure Pc is increased depending upon a difference between the rotating speeds of the front and rear drive wheels. Alternatively, the hydraulic pressure Pc is controlled such that a detected actual yaw rate of the motor vehicle coincides with a target yaw rate which is calculated on the basis of the steering angle and running speed of the vehicle. In this respect, it is noted that the turning tendency of the vehicle increases as the torque of the rear drive wheels increases.

Figure 15:
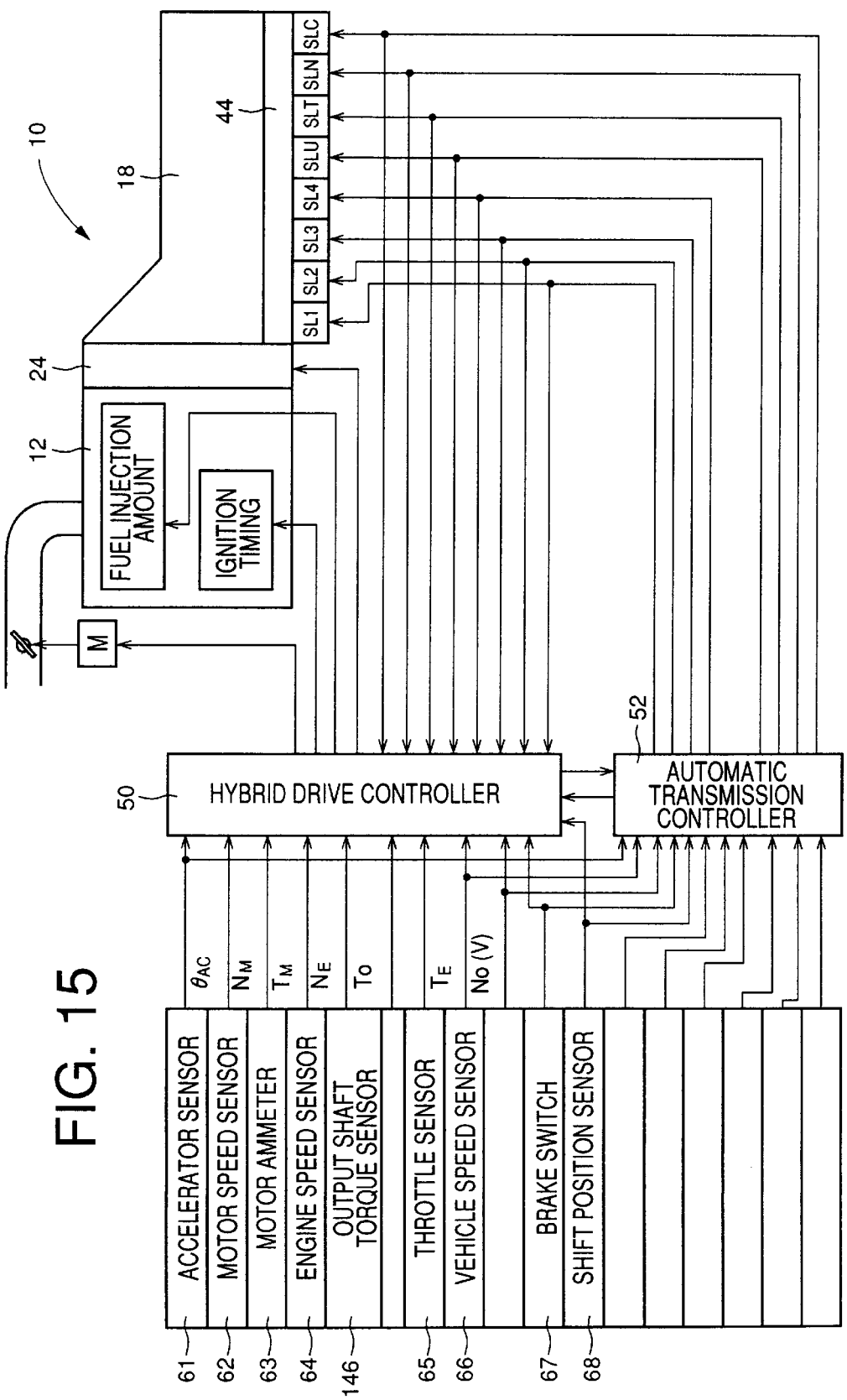
FIG. 15 is a view illustrating a control system used in the hybrid drive system of FIG. 14.
Figure 16:
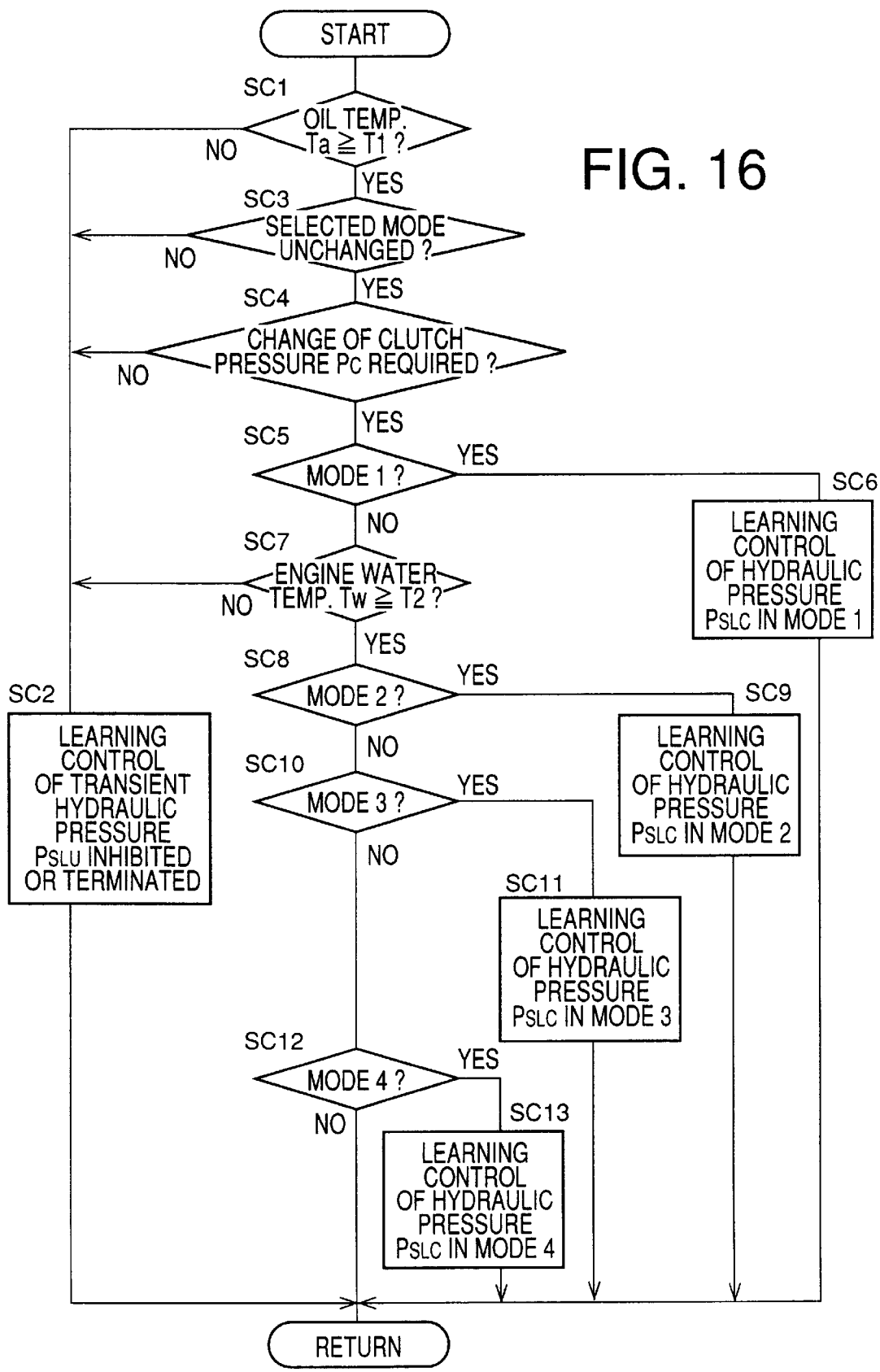
FIG. 16 is a flow chart illustrating a routine executed by a hybrid drive controller of the control system of FIG. 15.

The hybrid drive controller 50 is adapted to execute a routine illustrated in the flow chart of FIG. 16, to effect the learning control of a hydraulic pressure $P_{SLC}$ of the linear solenoid valve SLC, for thereby controlling the hydraulic pressure Pc of the differential limiting clutch Cs so as to change the distribution ratio of the vehicle drive torque by the center differential device 134. As shown in FIG. 15, the hybrid drive controller 50 receives an output signal of a torque sensor 146, which represents the output torque To of the output shaft 19 of the automatic transmission 18.

The routine of FIG. 16 is initiated with step SC1 which is identical with step SB1 of the routine of FIG. 11. If a negative decision (NO) is obtained in step SC2, the control flow goes to step SC2 identical with step SB2 of FIG. 11. If an affirmative decision (YES) is obtained in step SC1, the control flow goes to step SC3 which is identical with step SC3 of FIG. 11. Thus, steps SC1–SC3 are identical with steps SB1–SB3 of the routine of FIG. 11.

If an affirmative decision (YES) is obtained in step SC3, the control flow goes to step SC4 to determine whether the hydraulic pressure Pc of the differential limiting clutch Cs should be changed. This determination may be effected on the basis of the yaw rate of the vehicle or the steering angle and running speed of the vehicle and according to a predetermined data map for obtaining the desired torque distribution ratio of the center differential device 134. Alternatively, the determination in step SC4 may be effected on the basis of a difference $\Delta N_{FR}$ between the rotating speeds of the front and rear drive wheels. It will be understood that the linear solenoid valve SLC and a portion of the hybrid drive controller 50 assigned to implement step SC4 constitute torque distribution ratio changing means for changing the torque distribution ratio of the center differential device 134 which functions as the torque distributing mechanism.

If a negative decision (NO) is obtained in step SC4, the control flow goes to step SC2 to inhibit the learning control of the hydraulic pressure $P_{SLC}$.

If an affirmative (YES) is obtained in step SC4, the control flow goes to step SC5 whether the operation mode 1 is currently selected, that is, whether the hybrid drive system 128 is placed in the motor drive mode for driving the vehicle with only the electric motor (motor/generator) 14 used as the drive power source.

If an affirmative decision (YES) is obtained in step SC5, the control flow goes to step SC6 in which the learning control of the hydraulic pressure $P_{SLC}$ is effected in a manner suitable for the operation mode 1 (motor drive mode). In step SC6, an input torque of the center -15 differential device 134, that is, the output torque To of the automatic transmission 18 is initially detected by the torque sensor 146 (FIG. 15). Then, a basic value $P_{SLC}^*$ and a compensating value $\Delta P_{SLC}$ which are used to calculate the hydraulic pressure $P_{SLC}$ of the linear solenoid valve SLC according to the following equation (10) are obtained on the basis of the estimated input torque value of the center differential device 134 and according to predetermined data maps stored in the hybrid drive controller 50.

$$P_{SLC}=P_{SLC}^*+\Delta P_{SLC} \qquad (10)$$

Thus, the hydraulic pressure $P_{SLC}$ of the linear solenoid valve SLC is determined. As a result, the hydraulic pressure Pc of the differential limiting clutch Cs connected to the linear solenoid valve SLC is changed. The compensating value $\Delta P_{SLC}$ is changed or updated, if necessary, on the basis of the speed difference $\Delta N_{FR}$, for example, depending upon the operating state of the differential limiting clutch Cs after the pressure Pc is changed. That is, the data map of FIG. 18 for the operation mode 1 is updated, if necessary.

An example of the data map used to calculate the basic value $P_{SLC}^*$ is illustrated in FIG. 17, while examples of the data maps used to calculate the compensating value $\Delta P_{SLC}$ is illustrated in FIG. 18. The data map of FIG. 17 represents a relationship between the input torque of the center differential device 134 (output torque To of the automatic transmission 18) and the basic value $P_{SLC}^*$ of the hydraulic pressure $P_{SLC}$. One of the four data maps of FIG. 18 is selectively used depending upon the currently selected one of the four operation modes 1–4. Each data map of FIG. 18 represents a relationship between the input torque of the center differential device 134 and the compensating value $\Delta P_{SLC}$. The basic value $P_{SLC}^*$ and the compensating value $\Delta P_{SLC}$ are obtained by interpolation between two adjacent values in the data maps, on the basis of the detected input torque which generally falls between the two adjacent values in the data maps.

If a negative decision (NO) is obtained in step SC5, that is, the currently selected operation mode is not the operation mode 1, the control flow goes to step SC7 to determine whether the water temperature Tw (° C.) of the engine 12 is equal to or higher than the predetermined threshold T2. This step SC7 is identical with step SB8 of the routine of FIG. 11.

If a negative decision (NO) is obtained in step SC7, the control flow goes to step SC2 to inhibit or terminate the learning control of the center differential device 134. Thus, the learning control is not effected when the water temperature Tw is lower than the threshold T2, that is, immediately after starting of the engine 12, because the operation of the engine 12 has not been stabilized yet. This arrangement is effective to improve the reliability of the learning control.

If an affirmative decision (YES) is obtained in step SC7, the control flow goes to step SC8 determine whether the operation mode 2 is currently selected, that is, whether the hybrid drive system 128 is placed in the engine drive mode for driving the vehicle with only the engine 12 used as the drive power source.

If an affirmative decision (YES) is obtained in step SC8, the control flow goes to step SC9 in which the learning control of the hydraulic pressure $P_{SLC}$ is effected in a manner suitable for the operation mode 2. In step SC9, the basic value $P_{SLC}^*$ and the compensating value $\Delta P_{SLC}$ to calculate the hydraulic pressure $P_{SLC}$ of the linear solenoid valve SLC are obtained on the basis of the detected input torque of the center differential device 134 and according to the predetermined data maps, as in the same manner as described above with respect to step SC6. If necessary, the compensating value $\Delta P_{SLC}$ is changed. That is, the data map of FIG. 18 for the operation mode 2 is updated as needed.

If a negative decision (NO) is obtained in step SC8, the control flow goes to step SC10 to determine whether the operation mode 3 is currently selected, that is, whether the hybrid drive system 128 is placed in the engine drive +charging mode for driving the vehicle with only the engine 12 used as the drive power source, while the motor/generator 14 is operated to charge the electric energy storage device 58.

If an affirmative decision (YES) is obtained in step SC10, the control flow goes to step SC11 in which the learning control of the hydraulic pressure $P_{SLC}$ is effected in a manner suitable for the operation mode 3. That is, the basic value $P_{SLC}^*$ and the compensating value $\Delta P_{SLC}$ to calculate the hydraulic pressure $P_{SLC}$ are obtained on the basis of the input torque of the center differential device 134 and according to the data maps of FIGS. 17 and 18, as described above with respect to step SC6. If necessary, the compensating value $\Delta P_{SLC}$ is changed. That is, the data map of FIG. 18 for the operation mode 3 is updated as needed.

If a negative decision (NO) is obtained in step SC10, the control flow goes to step SC12 to determine whether the operation mode 4, namely, engine-motor drive mode is currently selected to drive the vehicle with both the engine 12 and the motor/generator 14.

If an affirmative decision (YES) is obtained in step SC12, the control flow goes to step SC13 in which the learning control of the hydraulic pressure $P_{SLC}$ is effected in a manner suitable for the operation mode 4. That is, the basic value $P_{SLC}^*$ and the compensating value $\Delta P_{SLC}$ are obtained on the basis of the detected input torque of the center differential device 134 and according to the data maps of FIGS. 17 and 18. If necessary, the compensating value $\Delta P_{SLC}$ is changed. That is, the data map of FIG. 18 for the operation mode 4 is updated as needed.

It will be understood that a portion of the hybrid drive controller 50 assigned to implement steps SC5, SC6 and SC8–SC13 constitutes learning control means for effecting learning control of a controllable variable of the center differential device 134, that is, the hydraulic pressure $P_{SLC}$ of the linear solenoid valve SLC (hydraulic pressure Ps of the differential limiting clutch Cs), depending upon the currently selected operation mode of the hybrid drive system 10. The learning control means includes pressure control means for controlling the hydraulic pressure $P_{B3}$. It will also be understood that steps SC6, SC9, SC11 and SC13 correspond to pressure control means for controlling the hydraulic pressure $P_{SLC}$, while steps SC1–SC3 and SC7 correspond to learning control inhibiting means for inhibiting the learning control means from operating to effect the learning control of the hydraulic pressure $P_{SLC}$.

In the present third embodiment of FIGS. 14–18, the hybrid drive controller 50 is adapted to calculate the hydraulic pressure $P_{SLC}$ on the basis of the compensating value $\Delta P_{SLC}$, which is obtained according to one of the four data maps which corresponds to the currently selected operation mode of the hybrid drive system 10 or running mode of the vehicle. In addition, these data maps for the compensating values $l_{SLC}$ are updated depending upon the operating state of the differential limiting clutch Cs after the pressure $P_{SLC}$ is changed. Thus, the data maps for the compensating value $\Delta P_{SLC}$ used to control the hydraulic pressure Ps of the differential limiting clutch Cs are updated independently of each other in the different operation modes of the hybrid drive system 128, whereby the the distribution ratio of the drive torque by the center differential device 134 can be changed with a reduced shock, irrespective of variations in the inertia torque and output torque of the engine 10 and motor/generator 14, for example.

In the present hybrid drive system 128, the learning control of the hydraulic pressure $P_{SLC}$ is inhibited when the operation mode is changed immediately after the new operation mode is selected, or before the operating condition of the transmission or engine has not been stabilized due to insufficiently low temperature of the oil in the hydraulic control device 44 or the coolant water of the engine. Therefore, the updating of the data maps to change the compensating value $\Delta P_{SLC}$ for learning control of the hydraulic pressure $P_{SLC}$ is not effected in a transient state of the vehicle in which the inertia and output characteristics of the drive power source are not stable. This arrangement is effective to improve the reliability of the learning control of the hydraulic pressure $P_{SLC}$ and the hydraulic pressure of the clutch Cs, whereby the torque distribution ratio of the center differential device 134 can be suitably controlled according to the data maps of FIG. 18.

Figure 19:
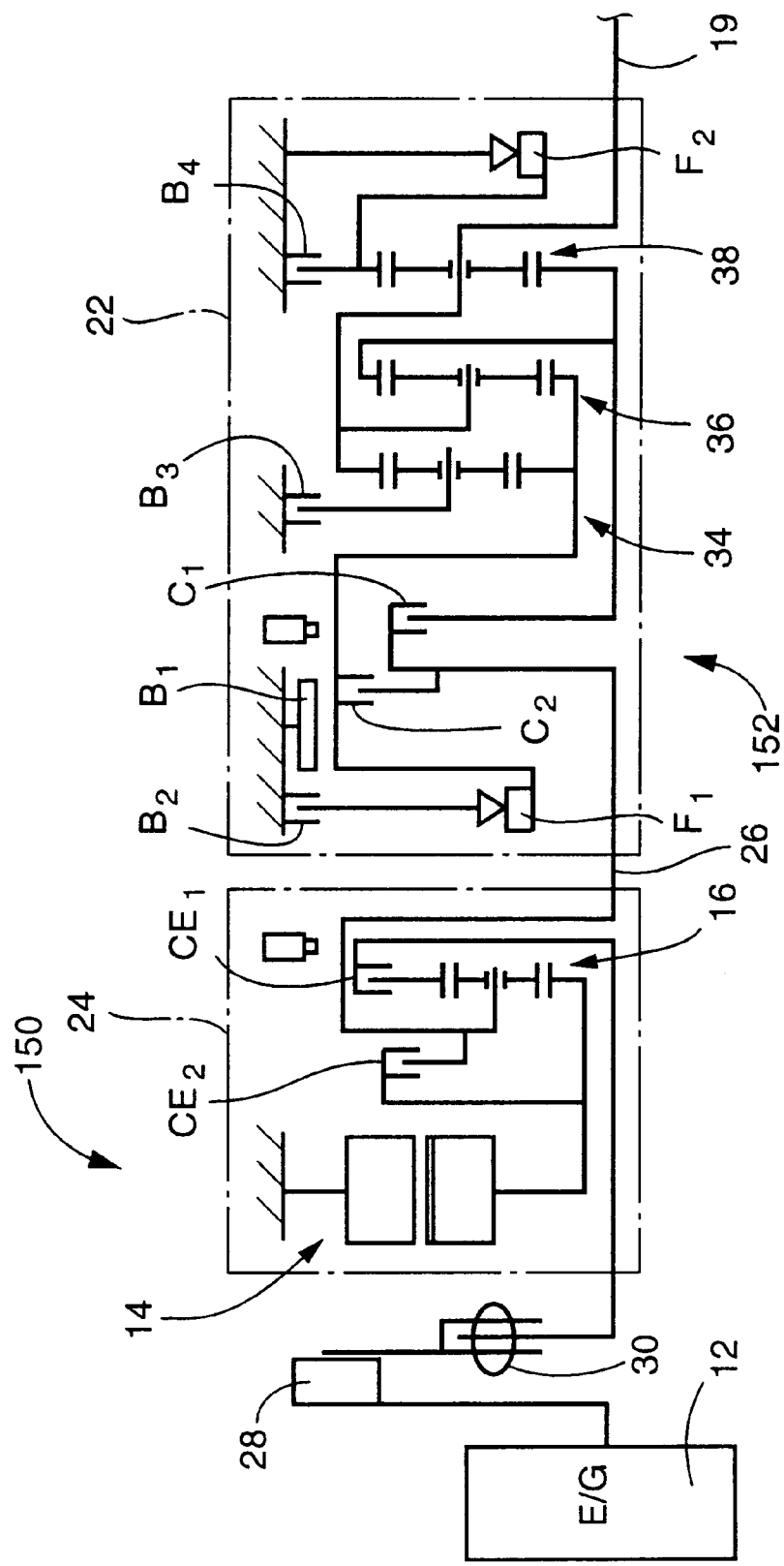
FIG. 19 is a schematic view showing a hybrid drive system according to a still further embodiment of this invention.

FIGS. 19 and 20 show a hybrid drive system 150 constructed according to a fourth embodiment of this invention. In the hybrid drive system 10 in the preceding embodiments, the automatic transmission 18 has the auxiliary transmission 20 as well as the primary transmission 22. The hybrid drive system 150 shown in FIG. 19 uses an automatic transmission 152 which does not have the auxiliary transmission 20 and consists solely of the primary transmission 22. The automatic transmission 152 has four forward-drive positions and one rear-drive position, as indicated in FIG. 20.

While the presently preferred embodiments of the present invention have been described above by reference to the accompanying drawings, it is to be understood that the invention is not limited to the details of the illustrated embodiments, but may be embodied with various changes, modifications and improvements, which may occur to those skilled in the art, without departing from the spirit and scope of the invention defined in the following claims:

What is claimed is:

1. A hybrid drive system for a motor vehicle, comprising:
   a drive power source consisting of an engine operated by combustion of a fuel, and an electric motor operated with an electric energy, at least one of said engine and said electric motor being operated for running the motor vehicle in a plurality of running modes;
   a controllable device disposed between said drive power source and drive wheels of the motor vehicle; and
   a control device for controlling said controllable device on the basis of an input torque received by said controllable device,
   and wherein said control device comprises input torque estimating means for estimating said input torque of said controllable device depending upon a currently selected one of said plurality of running modes.

2. A hybrid drive system according to claim 1, wherein said controllable device comprises an automatic transmission having a plurality of operating positions having respective different speed ratios, said automatic transmission including a plurality of coupling devices which are selectively engaged and released for selectively establishing said plurality of operating positions, said control device controlling said coupling devices for at least one of shifting actions of said automatic transmission, on the basis of the input torque of said automatic transmission estimated by said input torque estimating means.

3. A hybrid drive system according to claim 2, wherein said coupling devices are hydraulically operated coupling devices, and said control device further comprises pressure control means for controlling a hydraulic pressure of at least one of two coupling devices of said hydraulically operated coupling devices on the basis of said input torque estimated by said input torque estimating means, one of said two coupling devices being engaged while the other of said two coupling devices being released, for shifting said automatic transmission from one of said operating positions to another.

4. A hybrid drive system according to claim 1, wherein said plurality of running modes include a motor drive mode in which the motor vehicle is driven by only said electric motor, and said input torque estimating means estimates said input torque on the basis of an output torque of said electric motor as compensated by an inertia of said electric motor.

5. A hybrid drive system according to claim 1, wherein said plurality of running modes include an engine drive mode in which the motor vehicle is driven by only said engine, and said input torque estimating means estimates said input torque on the basis of an output torque of said engine as compensated by an inertia and a torque loss of said engine.

6. A hybrid drive system according to claim 1, wherein said plurality of running modes include an engine-motor drive mode in which the motor vehicle is driven by both of said engine and said electric motor, and said input torque estimating means estimates said input torque on the basis of an output torque of said engine as compensated by an inertia and a torque loss of said engine, and an output torque of said electric motor as compensated by an inertia of said electric motor.

7. A hybrid drive system according to claim 1, further comprising an electric energy storage device for storing the electric energy with which said electric motor is operated, and wherein said plurality of running modes include an engine drive and charging mode in which the motor vehicle is driven by said engine while said electric motor is operated as an electric generator for charging said electric energy storage device, said input torque estimating means estimating said input torque on the basis of an output torque of said engine as compensated by an inertia and a torque loss of said engine, and a regenerative braking torque of said electric motor as compensated by an inertia of said electric motor.

8. A hybrid drive system according to claim 1, wherein said controllable device comprises an automatic transmission, and said control device further comprises learning control means for effecting a learning control of at least one controllable variable of said automatic transmission, which at least one controllable variable influences a shifting action of said automatic transmission, said learning control means effecting said learning control in different manners corresponding to said plurality of running modes of the motor vehicle.

9. A hybrid drive system for a motor vehicle, comprising:
   a drive power source consisting of an engine operated by combustion of a fuel, and an electric motor operated with an electric energy, at least one of said engine and said electric motor being operated for driving the motor vehicle in a plurality of running modes;
   an automatic transmission disposed between said drive power source and drive wheels of the motor vehicle; and
   a shift control device for controlling at least one controllable variable of said automatic transmission, which at least one controllable variable influences a shifting action of said automatic transmission,
   and wherein said shift control device comprises learning control means for effecting a learning control of said at least one controllable variable in different manners corresponding to said plurality of running modes of the motor vehicle.

10. A hybrid drive system according to claim 9, wherein said automatic transmission has a plurality of operating positions having respective different speed ratios, said automatic transmission including a plurality of coupling devices which are selectively engaged and released for selectively establishing said plurality of operating positions, said shift control device controlling said coupling devices for at least one of shifting actions of said automatic transmission.

11. A hybrid drive system according to claim 10, wherein said coupling devices are hydraulically operated coupling devices, and said learning control means includes pressure control means for effecting the learning control of a hydraulic pressure of at least one of two coupling devices of said hydraulically operated coupling devices in different manners corresponding to said plurality of running modes of the motor vehicle, said shift control device controlling said two coupling device such that one of said two coupling devices is engaged while the other of said two coupling devices is released, for shifting said automatic transmission from one of said operating positions to another.

12. A hybrid drive system according to claim 11, wherein said learning control means has memory means for storing a plurality of data maps corresponding to said plurality of running modes of the motor vehicle, each of said data maps representing a relationship between an operating parameter of said automatic transmission and a compensating value of said hydraulic pressure of each of said at least one of said two coupling devices, said learning control means determining said compensating value on the basis of said operating parameter and according to one of said data maps which corresponds to a currently selected one of said plurality of running modes.

13. A hybrid drive system according to claim 12, wherein said learning control means updates each of said data maps depending upon a condition in which said automatic transmission has been shifted from one of said plurality operating positions to another in said currently selected one of said plurality of running modes.

14. A hybrid drive system according to claim 12, wherein said shift control device further comprises input torque estimating means for estimating said input torque of said automatic transmission, as said operating parameter, depending upon said currently selected one of said plurality of running modes, said learning control means determining said compensating value of said hydraulic pressure on the basis of said input torque estimated by said input torque estimating means and according to said one of said data maps.

15. A hybrid drive system according to claim 9, wherein said shift control means further comprises learning control inhibiting means for inhibiting said learning control means from operating to effect said learning control of said at least one controllable variable, in at least one predetermined running condition of the motor vehicle including at least one of: a condition that the currently selected running mode of the motor vehicle has changed from one of said plurality of running modes to another during said shifting action of said automatic transmission; and a condition that a predetermined time has not passed after the currently selected running mode has been selected.

16. A hybrid drive system for a motor vehicle having front and rear drive wheels, comprising:
   a drive power source consisting of an engine operated by combustion of a fuel, and an electric motor operated with an electric energy, at least one of said engine and said electric motor being operated for driving the motor vehicle in a plurality of running modes;
   a torque distributing mechanism disposed between said drive power source and said drive wheels of the motor vehicle, for distributing a drive torque produced by said drive power source to said front drive wheels and said rear drive wheels at a controllable distribution ratio;
   torque distribution ratio changing means for controlling said torque distributing mechanism to change said distribution ratio of said drive torque; and
   learning control means for effecting a learning control of a controllable variable of said torque distributing mechanism which influences said distribution ratio, when said distribution ratio is changed by said torque distribution ratio changing means,
   and wherein said learning control means effects said learning control of said controllable variable in different manners corresponding to said plurality of running modes of the motor vehicle.

17. A hybrid drive system according to claim 16, further comprising learning control inhibiting means for inhibiting an operation of said learning control means from operating to effect said learning control of said controllable variable, in at least one predetermined running condition of the motor vehicle.

18. A hybrid drive system according to claim 17, wherein said at least one predetermined running condition includes at least one of: a condition that a predetermined time has not passed after the currently selected running mode has been selected; a condition that a temperature of a working fluid for operating said torque distributing mechanism is lower than a predetermined lower limit; and a condition that a temperature of a coolant water for cooling said engine is lower than a predetermined lower limit.

19. A hybrid drive system according to claim 16, wherein said torque distributing mechanism comprises a center differential device including a hydraulically operated differential limiting clutch whose hydraulic pressure is changed by said torque distribution ratio changing means.

20. A hybrid drive system according to claim 19, wherein said learning control means comprises pressure control means for effecting learning control of said hydraulic pressure of said differential limiting clutch as said variable of said torque distributing mechanism, in different manners corresponding to said plurality of running modes of the motor vehicle.

21. A hybrid drive system according to claim 20, wherein said learning control means has memory means for storing a plurality of data maps corresponding to said plurality of running modes of the motor vehicle, each of said data maps representing a relationship between an operating parameter of said center differential device and a compensating value of said hydraulic pressure of said differential limiting clutch, said learning control means determining said compensating value on the basis of said operating parameter and according to one of said data maps which corresponds to a currently selected one of said plurality of running modes.

22. A hybrid drive system according to claim 21, wherein said operating parameter of said center differential device is an input torque received by said center differential device.

23. A hybrid drive system according to claim 21, wherein said learning control means updates each of said data maps depending upon a condition in which said distribution ratio is changed by changing said hydraulic pressure of said differential limiting clutch by said pressure control means, in one of said running modes which corresponds to said each data map.

* * * * *